(12) United States Patent
Chen et al.

(10) Patent No.: US 11,058,514 B2
(45) Date of Patent: Jul. 13, 2021

(54) METHOD AND SYSTEM FOR DENTITION MESH BRACES REMOVAL

(71) Applicant: Carestream Dental Technology Topco Limited, London (GB)

(72) Inventors: Shoupu Chen, Rochester, NY (US); Wei Ye, Shanghai (CN); Victor C. Wong, Pittsford, NY (US); Samuel Richard, Rochester, NY (US)

( * ) Notice: Subject to any disclaimer, the term of this patent is extended or adjusted under 35 U.S.C. 154(b) by 0 days.

(21) Appl. No.: 16/321,370

(22) PCT Filed: Jul. 28, 2016

(86) PCT No.: PCT/US2016/044399
§ 371 (c)(1),
(2) Date: Jan. 28, 2019

(87) PCT Pub. No.: WO2018/022054
PCT Pub. Date: Feb. 1, 2018

(65) Prior Publication Data
US 2019/0159868 A1 May 30, 2019

(51) Int. Cl.
*A61C 7/00* (2006.01)
*A61C 7/08* (2006.01)
*A61C 9/00* (2006.01)
*A61C 13/00* (2006.01)

(52) U.S. Cl.
CPC ............... *A61C 7/002* (2013.01); *A61C 7/08* (2013.01); *A61C 9/006* (2013.01); *A61C 13/0004* (2013.01)

(58) Field of Classification Search
CPC .......... A61C 7/002; A61C 7/08; A61C 9/006; A61C 13/0004
See application file for complete search history.

(56) References Cited

U.S. PATENT DOCUMENTS

| | | | | |
|---|---|---|---|---|
| 8,738,165 B2 * | 5/2014 | Cinader, Jr. | ........... | B33Y 50/00 700/98 |
| 2006/0134580 A1 * | 6/2006 | Raby | ...................... | A61C 13/16 433/213 |
| 2006/0134581 A1 * | 6/2006 | Kaufmann | ............... | A61C 7/00 433/213 |
| 2007/0188601 A1 * | 8/2007 | Rohaly | ................ | H04N 13/243 348/47 |
| 2008/0248443 A1 * | 10/2008 | Chishti | .................... | A61C 7/08 433/24 |
| 2011/0004331 A1 * | 1/2011 | Cinader, Jr. | ............. | A61C 7/00 700/98 |
| 2014/0067334 A1 * | 3/2014 | Kuo | ..................... | A61C 9/0046 703/1 |
| 2016/0004811 A1 * | 1/2016 | Somasundaram | ........ | G06T 7/11 703/11 |
| 2016/0199154 A1 * | 7/2016 | Schlimper | .............. | A61C 7/002 433/9 |
| 2017/0105814 A1 * | 4/2017 | Lim | ........................ | A61C 7/28 |

OTHER PUBLICATIONS

Syrek et al., "Clinical evaluation of all-ceramic crowns fabricated from intraoral digital impressions based on the principle of active wavefront sampling", Jul. 2010, Elsevier, vol. 38, No. 7, pp. 553-559 (Year: 2010).*

* cited by examiner

*Primary Examiner* — Vu Nguyen
*Assistant Examiner* — Jonathan M Cofino

(57) ABSTRACT

Exemplary method and apparatus embodiments of this application can obtain a digital model of an individual intraoral dentition and perform tooth surface restoration after brace representation removal that includes wires and brackets.

13 Claims, 29 Drawing Sheets

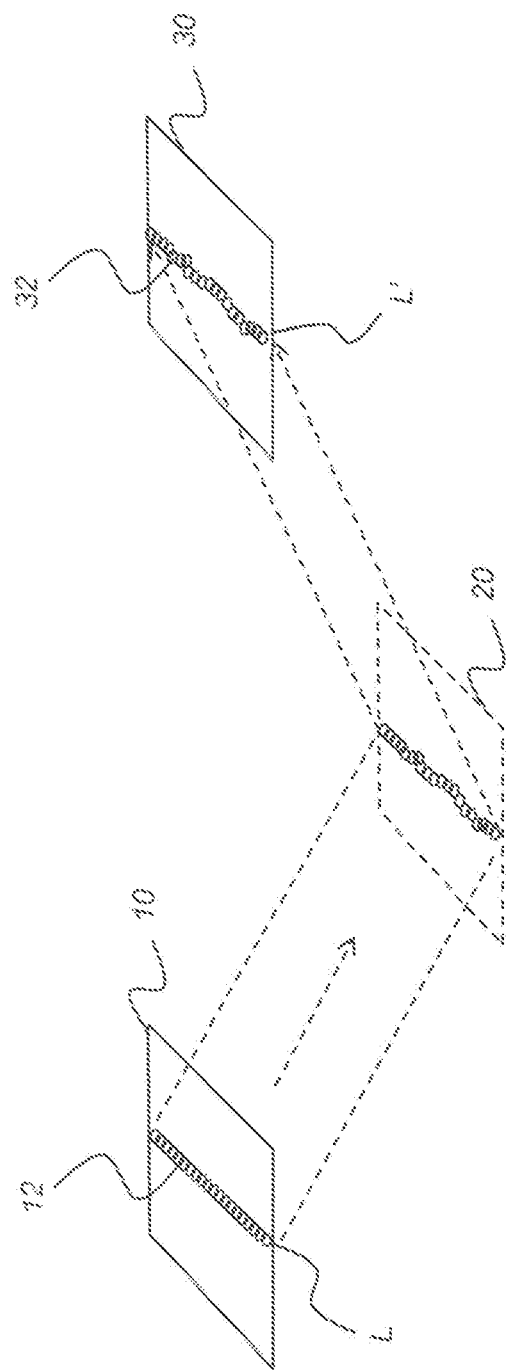

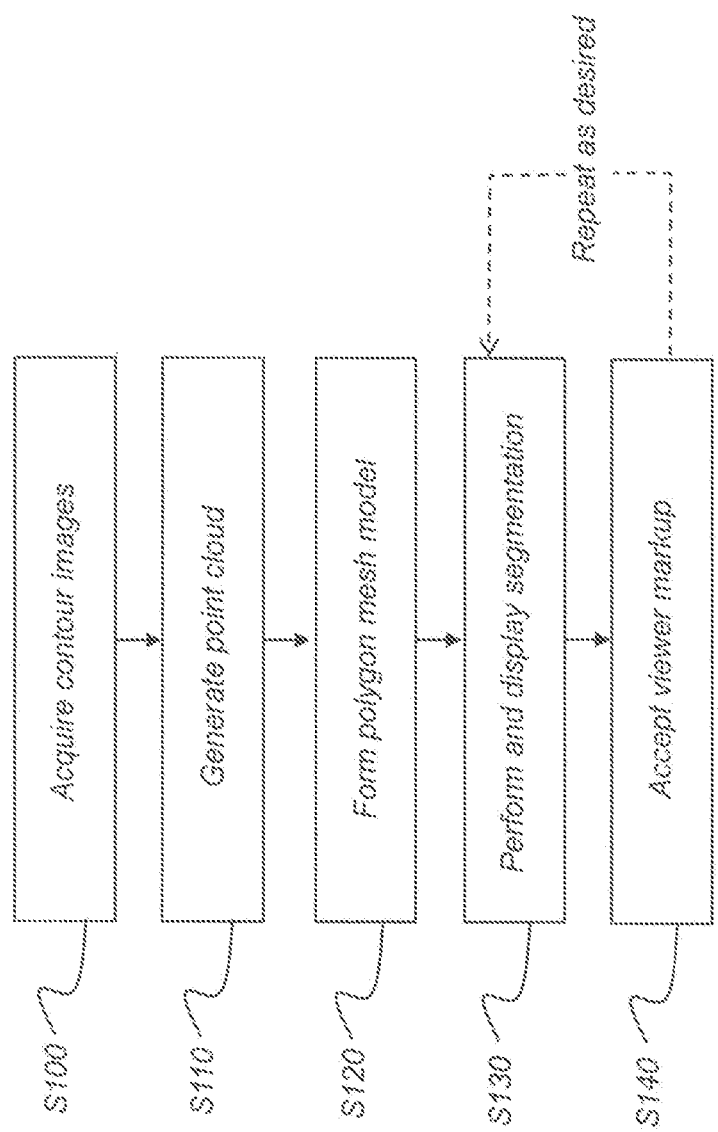

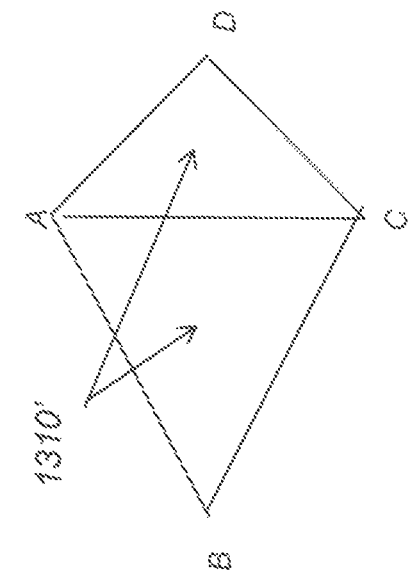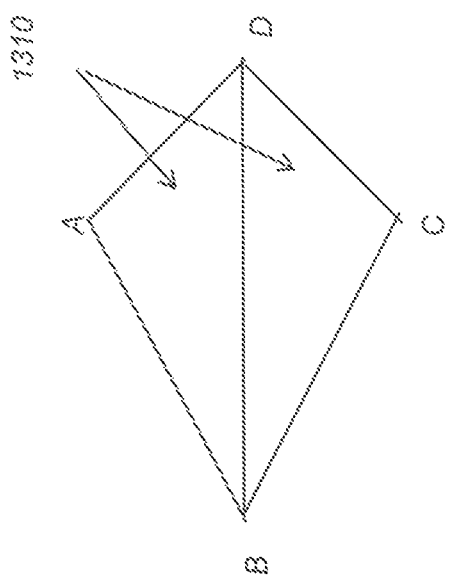
FIG. 13F

1806

1800

METHOD AND SYSTEM FOR DENTITION MESH BRACES REMOVAL

TECHNICAL FIELD

The disclosure relates generally to manipulation of elements that are represented by a three-dimensional mesh and more particularly to methods and apparatus for tooth crown surface manipulation in a contour image that has been obtained using reflectance imaging.

BACKGROUND

Three-dimensional (3-D) imaging and 3-D image processing are areas of growing interest to dental/orthodontic practitioners for computer-aided diagnosis and overall improved patient care. In the field of cephalometric analysis, 3-D imaging and 3-D image processing offer significant advantages in terms of flexibility, accuracy, and repeatability. 3-D cephalometric analysis overcomes some of the shortcomings associated with conventional methods of two-dimensional (2-D) cephalometric analysis, such as 2-D geometric errors of perspective projection, magnification, and head positioning in projection, for example. 3-D cephalometrics has been shown to yield objective data that is more accurate, since it is based on calculation rather than being largely dependent upon discrete measurements, as is the case with 2-D cephalometrics.

Early research using 3-D cephalometrics methods employed 3-D imaging and parametric analysis of maxillofacial anatomical structures using cone beam computed tomography (CBCT) of a patient's head. Using CBCT methods, a significant role of the 3-D cephalometric analysis was to define mathematical models of maxillary and mandibular arches for which the axes of inertia were calculated for each tooth or group of teeth. This, in turn, required the segmentation of individual teeth from the acquired CBCT head volume of a patient.

Conventionally, during an orthodontic treatment procedure, multiple 2-D X-ray cephalogram acquisitions are used to assess treatment progress. Conventional 3-D cephalometric analysis can also be used for this purpose, requiring multiple CBCT scans. However, both 2-D and 3-D radiographic imaging methods expose the patient to ionizing radiation. Reducing overall patient exposure to radiation is desirable, particularly for younger patients.

Optical intraoral scans, in general, produce contours of dentition objects and have been helpful in improving visualization of teeth, gums, and other intra-oral structures. Surface contour information can be particularly useful for assessment of tooth condition and has recognized value for various types of dental procedures, such as for restorative dentistry. This can provide a valuable tool to assist the dental practitioner in identifying various problems and in validating other measurements and observations related to the patient's teeth and supporting structures. Surface contour information can also be used to generate 3-D models of dentition components such as individual teeth; the position and orientation information related to individual teeth can then be used in assessing orthodontic treatment progress. With proper use of surface contour imaging, the need for multiple 2-D or 3-D X-ray acquisitions of a patient's dentition can be avoided.

A number of techniques have been developed for obtaining surface contour information from various types of objects in medical, industrial, and other applications. Optical 3-dimensional (3-D) measurement methods provide shape and spatial information using light directed onto a surface in various ways. Among types of imaging methods used for contour imaging are fringe projection devices. Fringe projection imaging uses patterned or structured light and camera/sensor triangulation to obtain surface contour information for structures of various types. Once the fringe projection images are processed, a point cloud can be generated. A mesh can then be formed from the point cloud or a plurality of point clouds, in order to reconstruct at least a planar approximation to the surface.

Mesh representation can be particularly useful for showing surface structure of teeth and gums and can be obtained using a handheld camera and without requiring harmful radiation levels. However, when using conventional image processing approaches, mesh representation has been found to lack some of the inherent versatility and utility that is available using cone-beam computed tomography (CBCT) or other techniques that expose the patient to radiation. One area in which mesh representation has yielded only disappointing results relates to segmentation. Segmentation allows the practitioner to identify and isolate the crown and other visible portions of the tooth from gums and related supporting structure. Conventional methods for segmentation of mesh images can often be inaccurate and may fail to distinguish tooth structure from supporting tissues.

Various approaches for addressing the segmentation problem for mesh images have been proposed, such as the following:

(i) A method described in the article "Snake-Based Segmentation of Teeth from Virtual Dental Casts" by Thomas Kronfeld et al. (in Computer-Aided Design & applications, 7(a), 2010) employs an active contour segmentation method that attempts to separate every tooth and gum surface in a single processing iteration. The approach that is described, however, is not a topology-independent method and can fail, particularly where there are missing teeth in the jaw mesh.

(ii) An article entitled "Perception-based 3D Triangle Mesh Segmentation Using Fast Marching Watershed" by Page, D. L. et al. (in Proc. CVPI vol II 2003) describes using a Fast Marching Watershed method for mesh segmentation. The Fast Marching Watershed method that is described requires the user to manually enter seed points. The seed points must be placed at both sides of the contours of the regions under segmentation. The method then attempts to segment all regions in one step, using seed information. For jaw mesh segmentation, this type of method segments each tooth as well as the gum at the same time. This makes the method less desirable, because segmenting teeth from the gum region typically requires parameters and processing that differ from those needed for the task of segmenting teeth from each other. Using different segmentation strategies for different types of dentition components with alternate segmentation requirements would provide better performance.

(iii) For support of his thesis, "Evaluation of software developed for automated segmentation of digital dental models", J. M. Moon used a software tool that decomposed the segmentation process into two steps: separation of teeth from gingival structure and segmentation of whole arch structure into individual tooth objects. The software tool used in Moon's thesis finds maximum curvature in the mesh and requires the user to manually choose a curvature threshold to obtain margin vertices that are used for segmenting the tooth. The software also requires the user to manually edit margins in order to remove erroneous segmentation results. Directed to analysis of shape and positional characteristics, this software tool does not consider employing color information in the separation of teeth regions from the gum regions.

(iv) U.S. Patent application 20030039389 A1 entitled "Manipulation a digital dentition model to form models of individual dentition components" by Jones, T. N. et al. disclose a method of separating portions of the dentition model representing the adjacent teeth.

While conventional methods exhibit some level of success with a limited set of test cases, none of these methods appears to be robust and commercially viable. In addition, conventional methods do not provide any capability to deal with brackets/braces that are frequently present in scanned dentition mesh models.

It is desirable to remove the physical bracket braces from the teeth before performing intraoral scanning to obtain a clear 3D view of the teeth mesh model for progress assessment (e.g., several times) during treatment (e.g., orthodontic). However, tooth enamel may be damaged by removing the braces (e.g., de-bonding, staining, plague accumulation on the rough surface, etc.). The enamel thickness lost during bracket removal has been estimated to be approximately 150 micron. One solution is to scan the dentition/dental arch without removing the physical braces from the teeth, and clean up the dental arch mesh by mesh manipulation.

U.S. Pat. No. 8,738,165, entitled "Methods of preparing a virtual dentition model and fabricating a dental retainer therefrom", discloses that a virtual model of a dental patient's dentition is provided by obtaining a digital data file of the patient's teeth and orthodontic appliances connected to the teeth, and then combining data from the data file with other data that represents surfaces of the teeth underlying the appliances. In '165, the virtual model is used in preparing a physical model of the patient's current dentition that can be used to make a dental retainer. '165 also discloses that editing tools in image manipulating software can be used to remove the data representing the orthodontic appliances. The image manipulating software used in '165 is known as "Geomagic Studio" (from Geomagic, Inc. of Research Triangle Park, N.C.), in which portions of an image have to be identified and deleted by a technician using a computer mouse or other input device. U.S. Pat. No. 8,738,165 further discloses that software known as "ZBrush" (from Pixologic, Inc. of Los Angeles, Calif.) is used to digitally/manually fine-tune and sculpt the combined data.

There is, then, a need for improved methods and/or apparatus, preferably without human intervention or with little human assistance, for segmentation of mesh representations of tooth and gum structures including brackets removal with tooth/crown surface reconstruction.

SUMMARY

An aspect of this application is to advance the art of tooth segmentation and/or manipulation in relation to volume imaging and visualization used in medical and dental applications.

Another aspect of this application is to address, in whole or in part, at least the foregoing and other deficiencies in the related art.

It is another aspect of this application to provide, in whole or in part, at least the advantages described herein.

Method and/or apparatus embodiments according to the present disclosure can address particular needs for improved visualization and assessment of 3D dentition models, where brace representations have been removed or reduced and tooth surfaces added or restored for clarity. Restored 3D dentition models can be used with internal structures obtained using CBCT and other radiographic volume imaging methods or can be correlated to reflectance image data obtained from the patient.

These objects are given only by way of illustrative example, and such objects may be exemplary of one or more embodiments of the application. Other desirable objectives and advantages inherently achieved by exemplary method and/or apparatus embodiments may occur or become apparent to those skilled in the art. The invention is defined by the appended claims.

According to one aspect of the disclosure, there is provided a method for generating a digital model of reconstructed dentition that can include obtaining a 3-D digital mesh model of the patient's dentition including braces, teeth, and gingival, modifying the 3-D digital mesh dentition model by removing wire portions of the braces therefrom, modifying the 3-D digital mesh dentition model by removing bracket portions of the braces therefrom, teeth surfaces of the modified 3-D digital mesh dentition model previously covered by the wire portions and the bracket portions of the braces, and displaying, storing, or transmitting over a network to another computer, the reconstructed 3-D digital mesh dentition model.

BRIEF DESCRIPTION OF THE DRAWINGS

The foregoing and other objects, features, and advantages of the invention will be apparent from the following more particular description of the embodiments of the invention, as illustrated in the accompanying drawings. Elements of the drawings are not necessarily to scale relative to each other.

FIG. 2 shows schematically how patterned light is used for obtaining surface contour information using a handheld camera or other portable imaging device.

FIG. 6A is a logic flow diagram that shows a hybrid sequence for mesh segmentation according to an embodiment of the present disclosure.

FIG. 13F is a diagram that shows an initial arrangement of triangles in a tooth surface mesh patch and a modified arrangement of triangles for a tooth surface mesh patch.

FIG. 15 also shows an example of a closed contour or snake encircling a bracket.

DETAILED DESCRIPTION OF EXEMPLARY EMBODIMENTS

Figure 1:
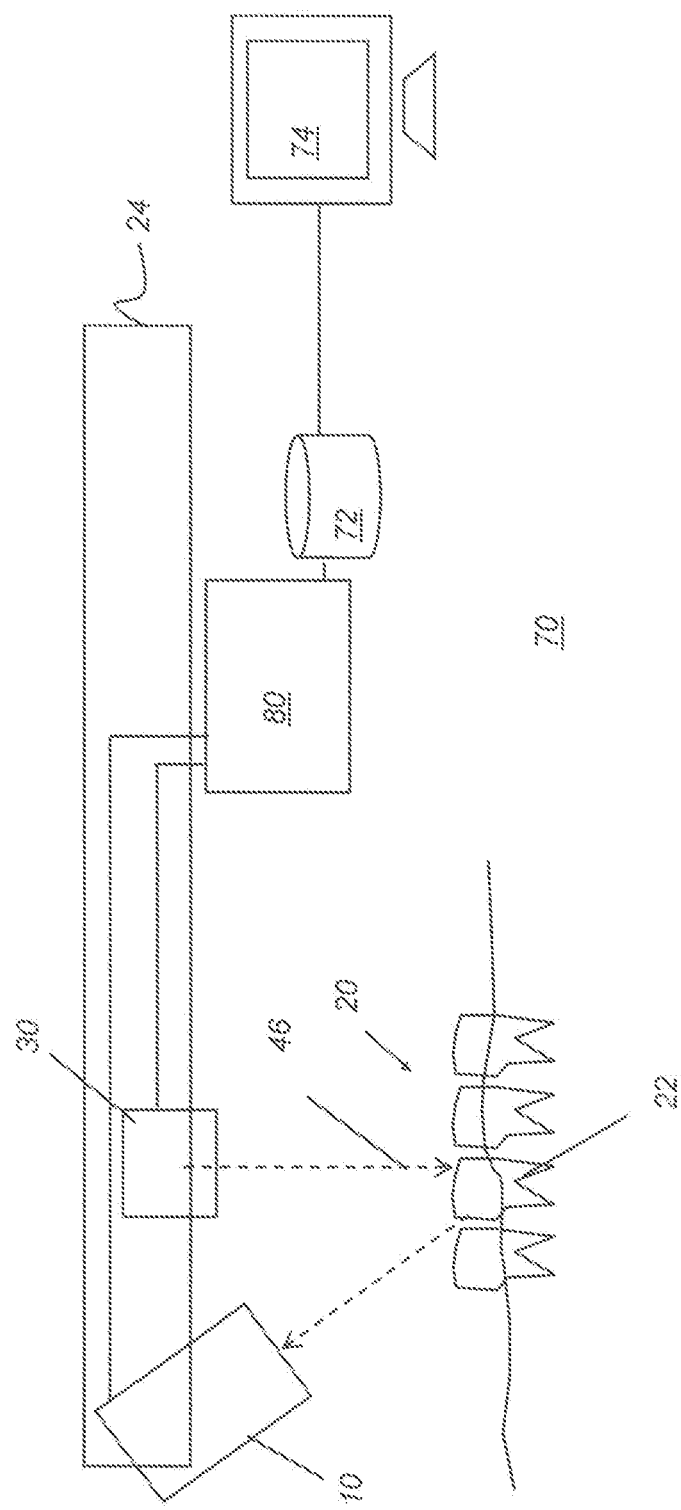
FIG. 1 is a schematic diagram that shows components of an imaging apparatus for surface contour imaging of a patient's teeth and related structures.

The following is a detailed description of exemplary embodiments, reference being made to the drawings in which the same reference numerals identify the same elements of structure in each of the several figures.

Where they are used, the terms "first", "second", and so on, do not necessarily denote any ordinal or priority relation, but may be used for more clearly distinguishing one element or time interval from another.

The term "exemplary" indicates that the description is used as an example, rather than implying that it is an ideal.

The term "in signal communication" as used in the application means that two or more devices and/or components are capable of communicating with each other via signals that travel over some type of signal path. Signal communication may be wired or wireless. The signals may be communication, power, data, or energy signals which may communicate information, power, and/or energy from a first device and/or component to a second device and/or component along a signal path between the first device and/or component and second device and/or component. The signal paths may include physical, electrical, magnetic, electromagnetic, optical, wired, and/or wireless connections between the first device and/or component and second device and/or component. The signal paths may also include additional devices and/or components between the first device and/or component and second device and/or component.

In the context of the present disclosure, the terms "pixel" and "voxel" may be used interchangeably to describe an individual digital image data element, that is, a single value representing a measured image signal intensity. Conventionally an individual digital image data element is referred to as a voxel for 3-dimensional or volume images and a pixel for 2-dimensional (2-D) images. For the purposes of the description herein, the terms voxel and pixel can generally be considered equivalent, describing an image elemental datum that is capable of having a range of numerical values. Voxels and pixels have attributes of both spatial location and image data code value.

"Patterned light" is used to indicate light that has a predetermined spatial pattern, such that the light has one or more features such as one or more discernable parallel lines, curves, a grid or checkerboard pattern, or other features having areas of light separated by areas without illumination. In the context of the present disclosure, the phrases "patterned light" and "structured light" are considered to be equivalent, both used to identify the light that is projected onto the head of the patient in order to derive contour image data.

In the context of the present disclosure, the terms "viewer", "operator", and "user" are considered to be equivalent and refer to the viewing practitioner, technician, or other person who views and manipulates a contour image that is formed from a combination of multiple structured light images on a display monitor.

A "viewer instruction", "operator instruction", or "operator command" can be obtained from explicit commands entered by the viewer or may be implicitly obtained or derived based on some other user action, such as making an equipment setting, for example. With respect to entries entered on an operator interface, such as an interface using a display monitor and keyboard, for example, the terms "command" and "instruction" may be used interchangeably to refer to an operator entry.

In the context of the present disclosure, a single projected line of light is considered a "one dimensional" pattern, since the line has an almost negligible width, such as when projected from a line laser, and has a length that is its predominant dimension. Two or more of such lines projected side by side, either simultaneously or in a scanned arrangement, provide a two-dimensional pattern. IN exemplary embodiments, lines of light can be linear, curved or three-dimensional.

The terms "3-D model", "point cloud", "3-D surface", and "mesh" may be used synonymously in the context of the present disclosure. The dense point cloud is formed using techniques familiar to those skilled in the volume imaging arts for forming a point cloud and relates generally to methods that identify, from the point cloud, vertex points corresponding to surface features. The dense point cloud is thus generated using the reconstructed contour data from one or more reflectance images. Dense point cloud information serves as the basis for a polygon model at high density for the teeth and gum surface.

According to the present disclosure, the phrase "geometric primitive" refers to basic 2-D geometric shapes that can be entered by the operator in order to indicate areas of an image. By way of example, and not limitation, geometric primitives can include lines, curves, points, and other open shapes, as well as closed shapes that can be formed by the operator, such as circles, closed curves, rectangles and squares, polygons, and the like.

Embodiments of the present disclosure provide exemplary methods and/or apparatus that can help to eliminate the need for multiple CBCT scans for visualization of tooth and jaw structures. Exemplary methods and/or apparatus embodiments can be used to combine a single CBCT volume with optical intraoral scans that have the capability of tracking the root position at various stages of orthodontic treatment, for example. To achieve this, the intraoral scans are segmented so that exposed portions, such as individual tooth crowns, from the intraoral scan can be aligned with the individual tooth and root structure segmented from the CBCT volume.

FIG. 1 is a schematic diagram showing an imaging apparatus 70 for projecting and imaging using structured light patterns 46. Imaging apparatus 70 uses a handheld camera 24 for image acquisition according to an embodiment of the present disclosure. A control logic processor 80, or other type of computer that may be part of camera 24 controls the operation of an illumination array 10 that generates the structured light and controls operation of an imaging sensor array 30. Image data from surface 20, such as from a tooth 22, is obtained from imaging sensor array 30 and stored in a memory 72. Control logic processor 80, in signal communication with camera 24 components that acquire the image, processes the received image data and stores the mapping in memory 72. The resulting image from memory 72 is then optionally rendered and displayed on a display 74. Memory 72 may also include a display buffer for temporarily storing display 74 image content.

In fringe projection imaging of a surface, a pattern of lines is projected from illumination array 10 toward the surface of an object from a given angle. The projected pattern from the surface is then viewed from another angle as a contour image, taking advantage of triangulation in order to analyze surface information based on the appearance of contour lines. Phase shifting, in which the projected pattern is incrementally shifted spatially for obtaining additional measurements at the new locations, is typically applied as part of fringe projection imaging, used in order to complete the contour mapping of the surface and to increase overall resolution in the contour image.

The schematic diagram of FIG. 2 shows, with the example of a single line of light L, how patterned light is used for obtaining surface contour information using a handheld camera or other portable imaging device. A mapping is obtained as an illumination array 10 directs a pattern of light onto a surface 20 and a corresponding image of a line L' is formed on an imaging sensor array 30. Each pixel 32 on imaging sensor array 30 maps to a corresponding pixel 12 on illumination array 10 according to modulation by surface 20. Shifts in pixel position, as represented in FIG. 2, yield useful information about the contour of surface 20. It can be appreciated that the basic pattern shown in FIG. 2 can be implemented in a number of ways, using a variety of illumination sources and sequences and using one or more different types of sensor arrays 30. Illumination array 10 can utilize any of a number of types of arrays used for light modulation, such as a liquid crystal array or digital micromirror array, such as that provided using the Digital Light Processor or DLP device from Texas Instruments, Dallas, Tex. This type of spatial light modulator is used in the illumination path to change the light pattern as needed for the mapping sequence.

By projecting and capturing images that show structured light patterns that duplicate the arrangement shown in FIGS. 1 and 2 multiple times, the image of the contour line on the camera simultaneously locates a number of surface points of the imaged object. This can speed the process of gathering many sample points, while the plane of light (and usually also the receiving camera) is laterally moved in order to "paint" some or all of the exterior surface of the object with the plane of light.

Figure 3:
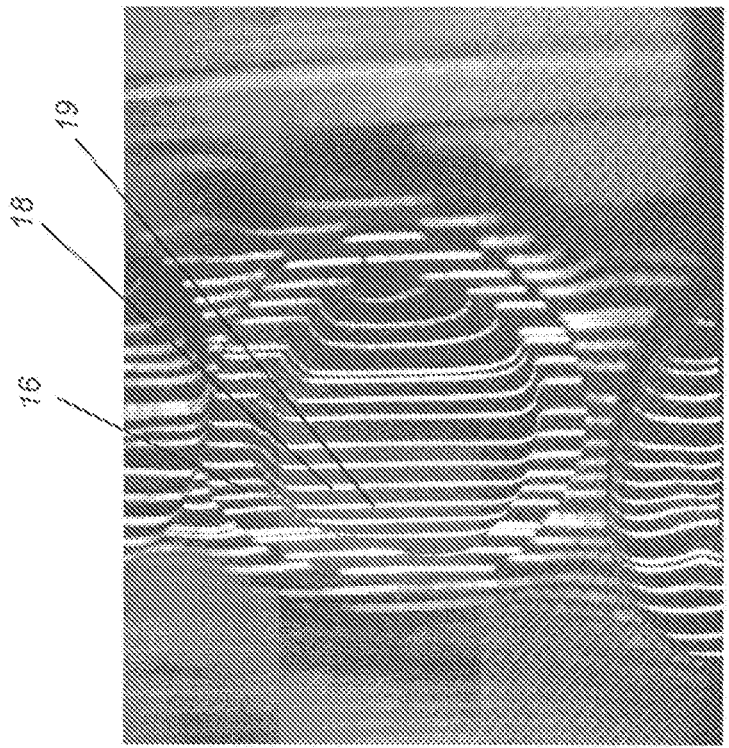
FIG. 3 shows an example of surface imaging using a pattern with multiple lines of light.

FIG. 3 shows surface imaging using a pattern with multiple lines of light. Incremental shifting of the line pattern and other techniques help to compensate for inaccuracies and confusion that can result from abrupt transitions along the surface, whereby it can be difficult to positively identify the segments that correspond to each projected line. In FIG. 3, for example, it can be difficult to determine whether line segment 16 is from the same line of illumination as line segment 18 or adjacent line segment 19.

Figure 4:
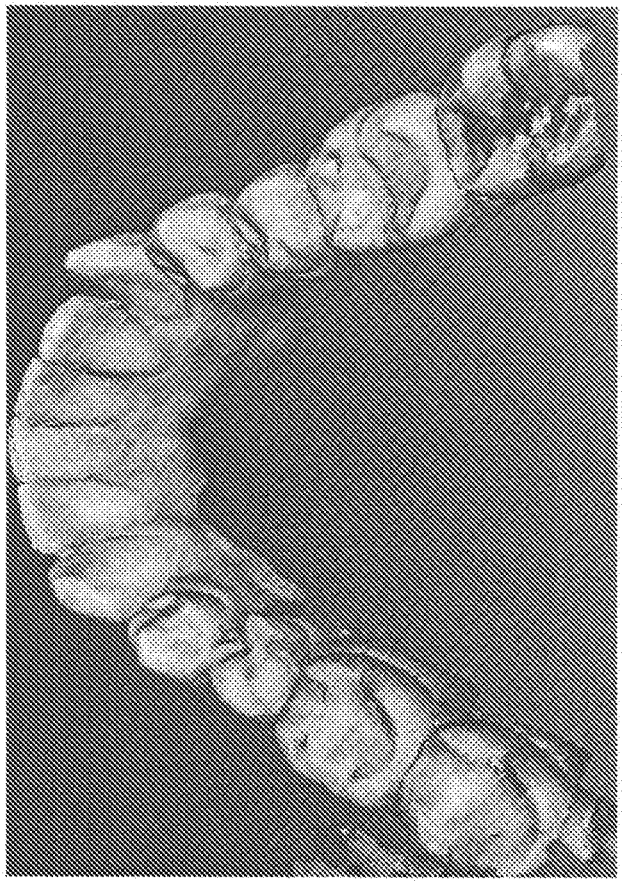
FIG. 4 shows a point cloud generated from structured light imaging, such as that shown in FIG. 3.

By knowing the instantaneous position of the camera and the instantaneous position of the line of light within an object-relative coordinate system when the image was acquired, a computer and software can use triangulation methods to compute the coordinates of numerous illuminated surface points. As the plane is moved to intersect eventually with some or all of the surface of the object, the coordinates of an increasing number of points are accumulated. As a result of this image acquisition, a point cloud of vertex points or vertices can be identified and used to represent the extent of a surface within a volume. By way of example, FIG. 4 shows a dense point cloud 50 generated from a structured light imaging apparatus, CS 3500 3-D camera made by Carestream Heath, Inc., Rochester N.Y., USA, using results from patterned illumination such as that shown in FIG. 3. The point cloud 50 models physical location of sampled points on tooth surfaces and other intraoral surfaces or, more generally, of surfaces of a real-world object. Variable resolution can be obtained. The example of FIG. 4 shows an exemplary 100 micron resolution. The points in the point cloud represent actual, measured points on the three dimensional surface of an object.

The surface structure can be approximated from the point cloud representation by forming a polygon mesh, in which adjacent vertices are connected by line segments. For a vertex, its adjacent vertices are those vertices closest to the vertex in terms of Euclidean distance.

Figure 5:
FIG. 5 shows a polygon mesh in the simple form of a triangular mesh.

By way of example, FIG. 5 shows a 3-D polygon mesh model 60 in the simple form of a triangular mesh. A triangular mesh forms a basic mesh structure that can be generated from a point cloud and used as a digital model to represent a 3-D object by its approximate surface shape, in the form of triangular plane segments sharing adjacent boundaries. Methods/apparatus for forming a polygon mesh model, such as a triangular mesh or more complex mesh structure, are well known to those skilled in the contour imaging arts. The polygon unit of the mesh model, and relationships between neighboring polygons, can be used in embodiments of the present disclosure to extract features (e.g., curvatures, minimum curvatures, edges, spatial relations, etc.) at the teeth boundaries.

In intra-oral imaging, segmentation of individual components of the image content from a digital model can be of value to the dental practitioner in various procedures, including orthodontic treatment and preparation of crowns, implants, and other prosthetic devices, for example. Various methods have been proposed and demonstrated for mesh-based segmentation of teeth from gums and of teeth from each other. However, drawbacks of conventional segmentation solutions include requirements for a significant level of operator skill and a high degree of computational complexity. Conventional approaches to the problem of segmenting tooth components and other dentition features have yielded disappointing results in many cases. Exemplary method and/or apparatus embodiments according to the present disclosure address such problems with segmentation that can utilize the polygonal mesh data as a type of source digital model and can operate in more than one stage: e.g., first, performing an automated segmentation algorithm/procedures that can provide at least a close or coarse approximation of the needed segmentation of the digital model; and second, allowing operator interactions to improve, correct and/or clean up observed errors and inconsistencies in the automated results, which can yield highly accurate results that are difficult to achieve in a purely automated manner, but not placing significant requirements on operator time or skill level and/or on needed computer resources. This hybrid approach in exemplary method and/or apparatus embodiments can help to combine computing and image processing power with operator perception to check, correct, and refine results of automated processing.

The logic flow diagram of FIG. 6A shows a hybrid sequence for tooth mesh segmentation and generation of a digital model to identify individual features or intraoral components such as teeth from within the mouth according to an exemplary embodiment of the present disclosure. In an image acquisition step S100, a plurality of structured light images of the patient's dentition are captured, providing a set of contour images for processing. A point cloud generation step S110 then generates a point cloud of the patient's dentition using the set of contour images. A polygon mesh generation step S120 forms a polygon mesh by connecting adjacent points from point cloud results. A triangular mesh provides one type of polygon mesh that can be readily generated for approximating a surface contour; more complex polygon mesh configurations can alternately be used.

Continuing with the FIG. 6A sequence, given the polygon mesh, a segmentation step S130 can be executed. For a dental contour image, for example, segmentation step S130 can distinguish teeth from gum tissue, as well as distinguishing one tooth from another. Segmentation results can then be displayed, showing the results of this initial, automated segmentation processing. The automated segmentation step S130 can provide an intermediate image. Thus automated step S130 can perform the bulk of segmentation processing, but can further benefit from operator review and refinements of results. For its automatic processing, segmentation step S130 can use any of a number of known segmentation techniques, such as fast-marching watershed algorithms, so-called snake-based segmentation, and other methods known to those skilled in the imaging arts, as noted earlier.

FIG. 6A also shows an optional repeat loop that can enable viewer interaction with the intermediate image for refining the results of the automated segmentation processing, for example, using the basic apparatus shown in FIG. 1. An accept operator instructions step S140 can be executed, during which the viewer indicates, on the displayed results, seed points, seed lines, block lines, boundary features, or other markings that identify one or more distinct features of the segmentation results to allow further segmentation refinement and processing. Viewer markup instructions cause segmentation step S130 to be executed at least a second time, this second time using input markup(s) from entered viewer instructions. It can be appreciated that different segmentation algorithms can be applied at various stages of automated or manual processing. Final results of segmentation processing can be displayed, stored, and transmitted between computers, such as over a wired or wireless network, for example.

The process shown in FIG. 6A can thus allow automated segmentation to perform the coarse segmentation (e.g., first segmentation) that can be more easily accomplished, such as segmentation of teeth from gum tissue, for example. Thus, for example, tooth and gum partitioning can be automated. In one embodiment, tooth and gum partitioning can use an automated curvature-based method that computes curvature of vertices in the mesh, and then uses a thresholding algorithm to identify margin vertices having large negative curvature. Alternately, color-based segmentation can be used for tooth segmentation from the gums. This type of method can obtain average hue values from regions of the image and calculate threshold values that partition image content.

Figure 6B:
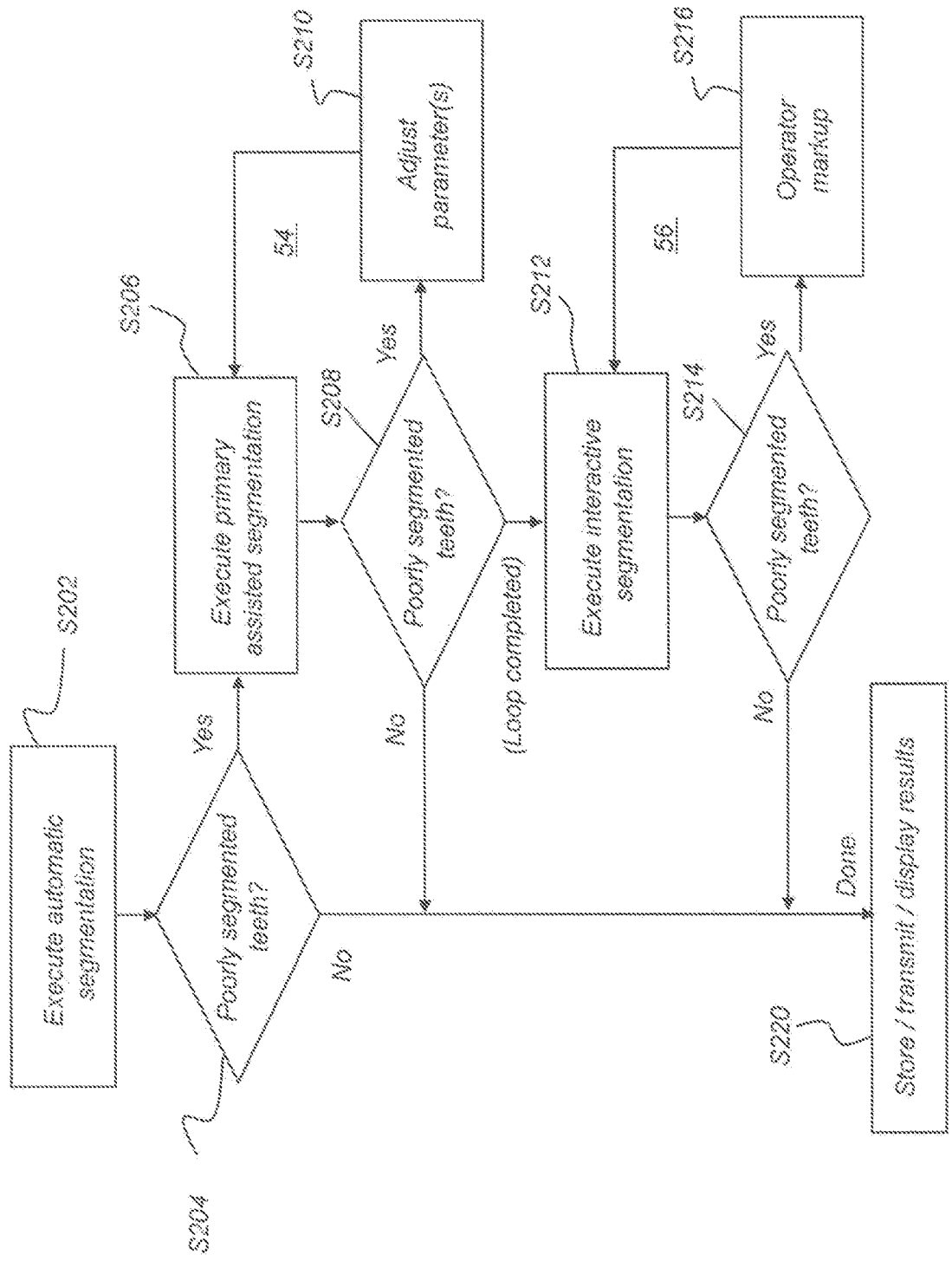
FIG. 6B is a logic flow diagram that shows a workflow sequence for hybrid segmentation of the tooth according to an embodiment of the present disclosure.
Figure 7A:
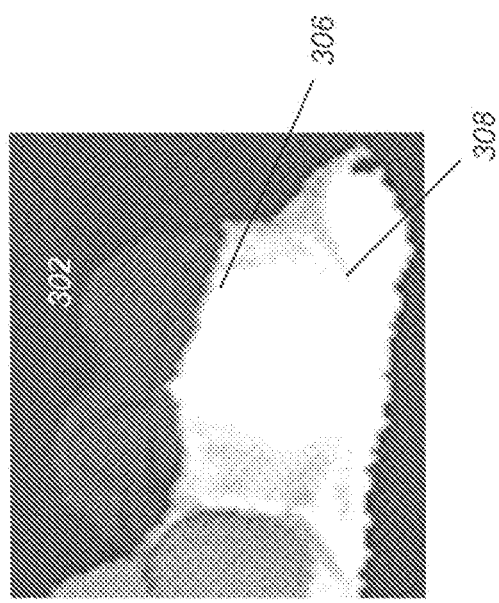
FIG. 7A shows an example of a poorly segmented tooth.

An exemplary embodiment of workflow for the hybrid tooth segmentation system is depicted in the logic flow diagram of FIG. 6B. Upon receiving a dentition mesh such as the one described in Step S120 and shown in FIGS. 4 and 5, the control logic processor 80 (FIG. 1) initiates an automated segmentation step S202 in which a fully automatic tooth segmentation tool is evoked to delineate teeth and gum regions and delineate individual teeth regions. The fully automatic tooth segmentation tool employs exemplary algorithms such as active contour models published in the literature or otherwise well-known to those skilled in the image processing arts. The delineation of teeth effectively produces individually segmented teeth; however, these generated teeth may contain poorly segmented intraoral components. A first checking step S204 then checks for poorly segmented intraoral components. Checking for incorrect or incomplete segmentation in step S204 can be accomplished either computationally, such as by applying trained artificial intelligence algorithms to the segmentation results, or by viewer interaction, such as following visual inspection by the viewer. By way of example, FIG. 7A shows an exemplary poorly segmented or mis-segmented tooth 302. As shown in FIG. 7A, a segmented tooth boundary 306 is not aligned with an actual tooth boundary 308.

Still referring to the workflow process in FIG. 6B, if checking Step S204 identifies one or more poorly segmented teeth, either computationally or visually, a primary assisted segmentation step S206 executes, activating a segmentation procedure that is also automated, but allows some level of operator adjustment. Primary assisted segmentation step S206 applies an algorithm for segmentation that allows operator adjustment of one or more parameters in a parameter adjustment step S210. Another checking step S208 executes to determine if additional segmentation processing is needed. The adjustable parameter can be altered computationally or explicitly by an operator instruction in step S210. Subsequent figures show an exemplary operator interface for parameter adjustment.

Figure 7B:
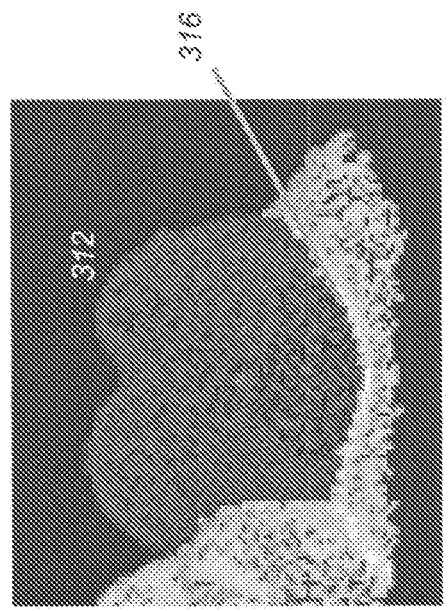
FIG. 7B shows an example of an improved segmentation.

An exemplary algorithm employed in primary assisted segmentation Step S206 can be a well-known technique, such as the mesh minimum curvature-based segmentation method. The adjustable parameter can be the threshold value of the curvature. With the help of the parameter adjustment in step S210, a correction of the poorly segmented tooth can be made. FIG. 7B shows an image of tooth 312 that, by comparison with FIG. 7A, shows a segmented tooth boundary 316 now well aligned with the actual boundary.

Figure 8B:
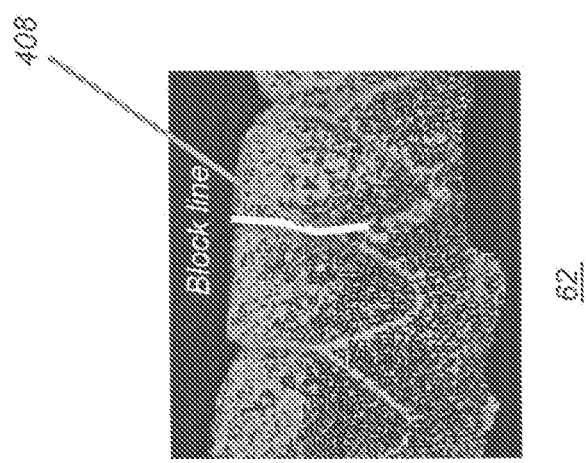
FIG. 8B shows an example of a block line trace pattern.
Figure 8A:
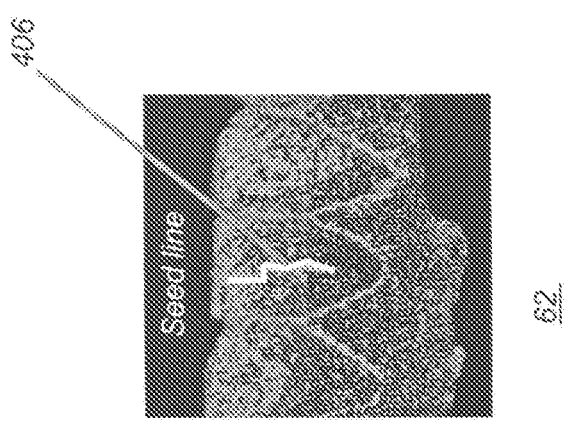
FIG. 8A shows an example of a seed line trace pattern.

However, as is clear from the exemplary workflow embodiment shown in FIG. 6B, the delineation of teeth performed in Step S206 may still produce poorly segmented intraoral components or features, so that a repeated segmentation process is helpful. The checking of poor segmentation in step S208 can be accomplished either computationally, such as by applying artificial intelligence algorithms to the segmentation results, or more directly, by visual inspection performed by the user. In addition to the adjustable parameter adjusted in Step S210, the hybrid tooth segmentation system optionally allows the user to add exemplary geometric primitives such as seed lines on the tooth region and add blocking lines between the teeth or between the teeth and gum to aid the tooth segmentation process. FIG. 8A shows an exemplary seed line 406 for marking a tooth, added to a mesh image 62. FIG. 8B shows an exemplary block line 408 for indicating space between two teeth, added to a mesh image 62.

The three basic steps, Step S206, Step S208 and Step S210 in the FIG. 6B sequence constitute an exemplary primary segmentation loop 54 that follows the fully automatic segmentation of step S202 and checking step S204. This exemplary primary segmentation loop 54 is intended to correct segmentation errors from the fully automated segmentation of automated segmentation step S202, as identified in step S204. Exemplary primary segmentation loop 54 can be executed one or more times, as needed. When exemplary primary segmentation loop 54 is successful, segmentation can be complete.

In some cases, however, additional segmentation processing beyond what is provided by primary segmentation loop 54 is needed. Segmentation processing can be complicated by various factors, such as tooth crowding, irregular tooth shapes, artifacts from scanning, indistinct tooth contours, and undistinguishable interstices among others. Where additional segmentation is needed, an exemplary secondary segmentation loop 56 can be used to provide more interactive segmentation approaches. The secondary segmentation loop 56 can include an interactive segmentation step S212, another checking step S214, and an operator markup step S216. Interactive segmentation step S212 can activate a segmentation process that works with the operator for indicating areas of the image to be segmented from other areas. Interactive segmentation step S212 can have an automated sequence, implemented by an exemplary algorithm such as a "fast march" method known to those skilled in the image segmentation arts. Step S212 may require population of the tooth region images by operator-entered seeds or seed lines or other types of geometric primitives before activation or during processing. In certain exemplary embodiments, seed lines or other features can be automatically generated in Step S100, S110 and S120 when the dentition mesh is entered into the system for optional operator adjustment (e.g., subsequent operations such as secondary segmentation loop 56 or Step 212). In addition, the features, seeds or seed lines can be added to the segmentation process in operator markup Step S216 by the user. The results from Step S212 are subject to inspection by the user in Step S216. Results from the hybrid automated/interactive segmentation processing can then be displayed in a display step S220, as well as stored and transmitted to another computer.

Following the sequence of FIG. 6B, some exemplary methods/apparatus of the present disclosure provide a hybrid tooth segmentation that provides the benefits of interactive segmentation with human-machine synergy.

Figure 9A:
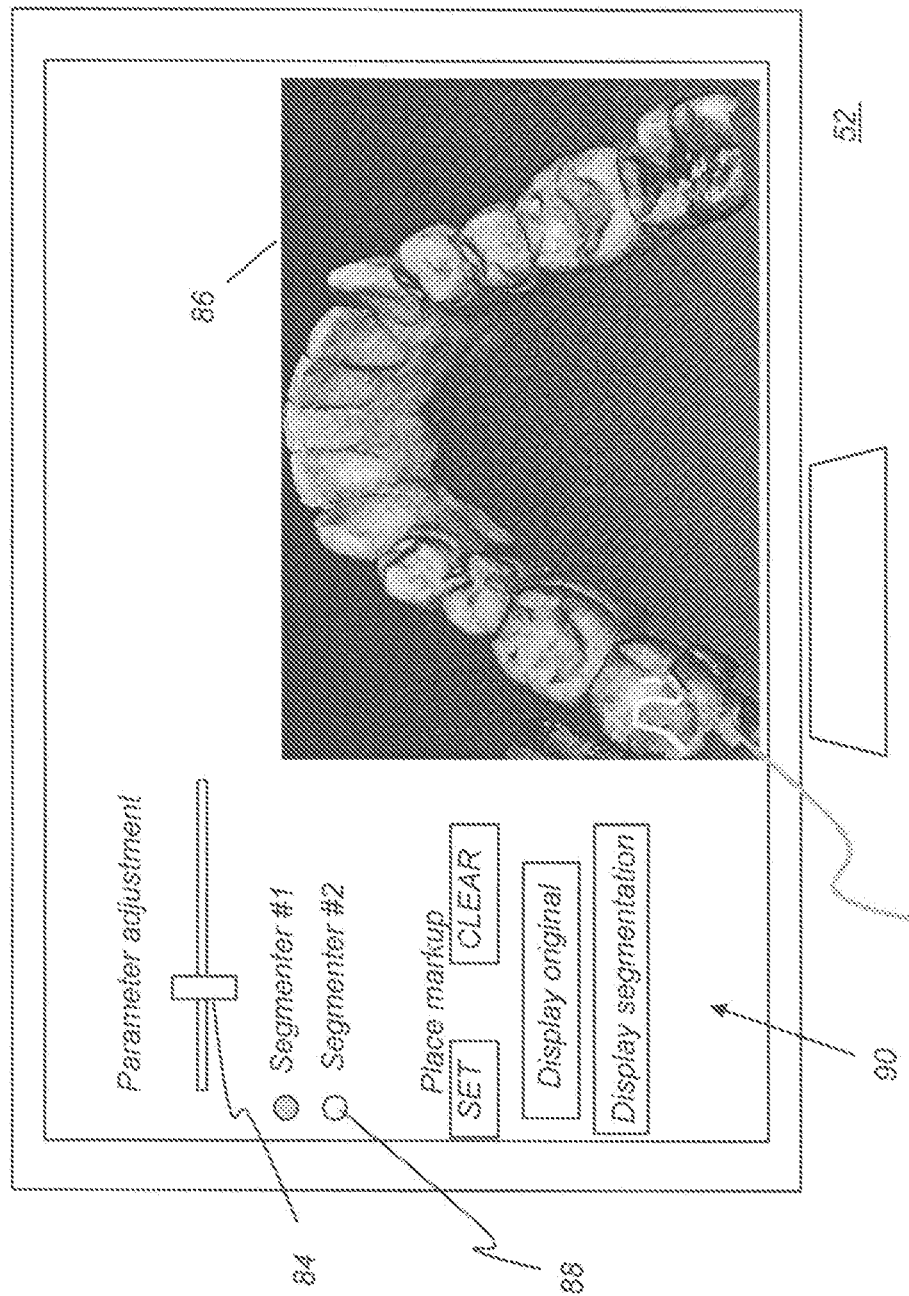
FIGS. 9A, 9B and 9C show operator interface screens for review and entry of markup instructions for refining tooth mesh segmentation processing according to certain embodiments of the present disclosure.
Figure 9B:
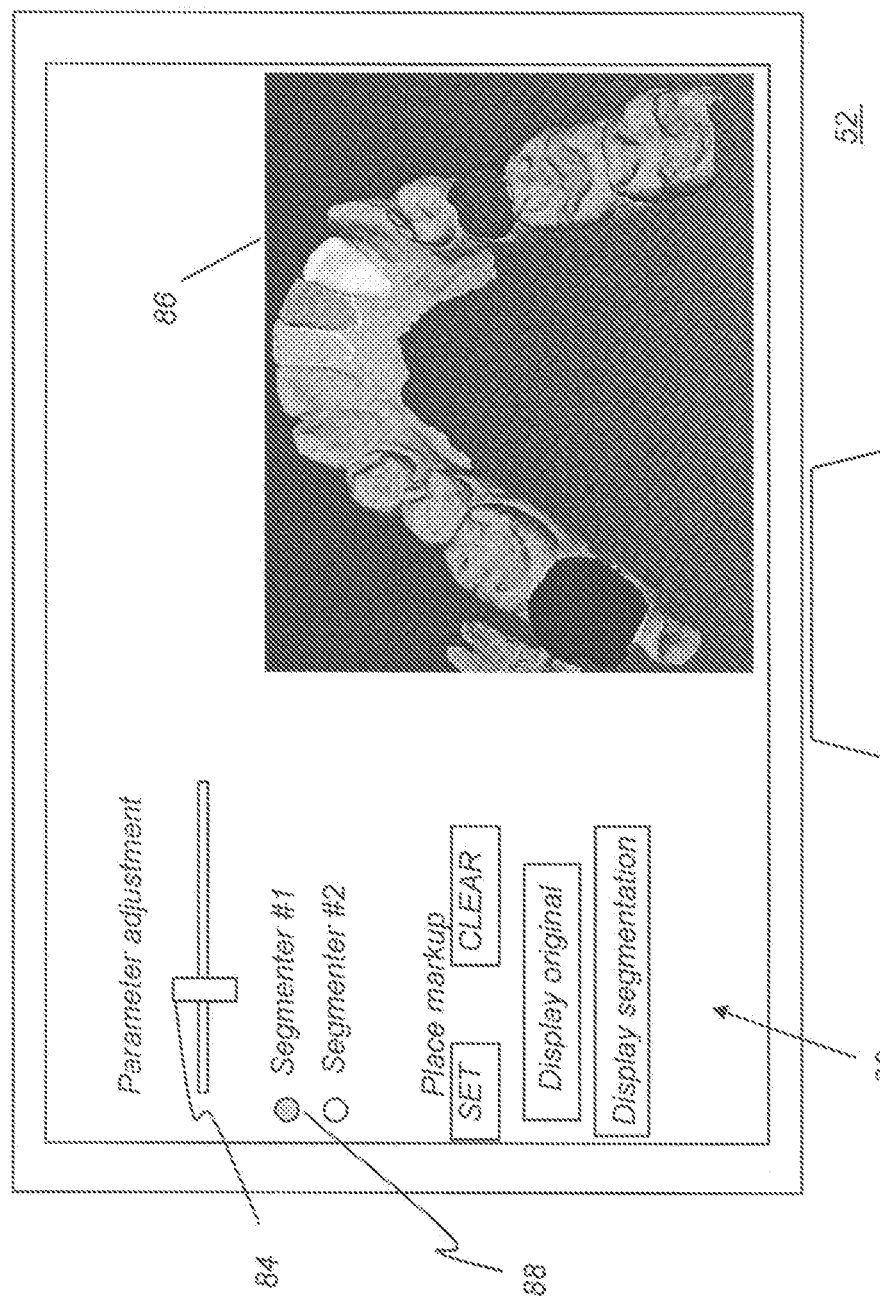
Figure 9C:
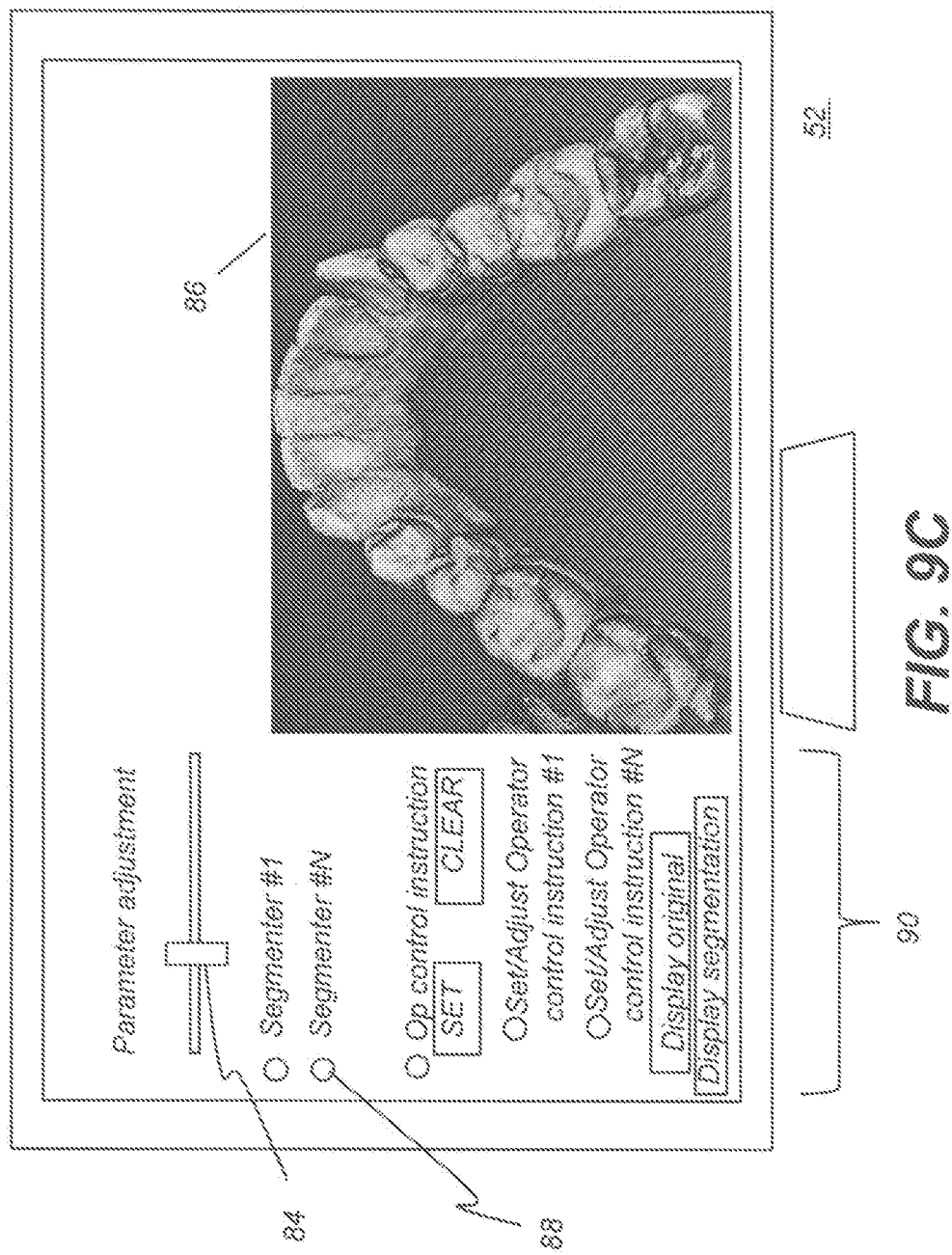

FIGS. 9A-9C show operator interface screens 52 for portions of a sequence for review and entry of markup instructions for refining mesh segmentation processing according to certain exemplary embodiments of the present disclosure. Interim mesh segmentation results are shown in a display area 86 on screen 52. A number of controls 90 for adjustment of the segmentation process are available, such as an adjustment control 84 for setting a level for overall aggressiveness or other parameter or characteristic of the segmentation processing algorithm. Optional selection controls 88 allow the viewer to specify one or more segmentation algorithms to be applied. This gives the operator an opportunity to assess whether one particular type of segmentation algorithm or another appear to be more successful in performing the segmentation task for the given mesh digital model. The operator can compare results against the original and adjust parameters to view results of successive segmentation attempts, with and without operator markup.

FIG. 9A also shows a trace pattern 96 that is entered as an operator seed line instruction for correcting or refining segmentation processing, as was shown previously with respect to FIG. 8A. According to an embodiment of the present disclosure, an operator mark in the form of trace pattern 96 or other arbitrary marking/geometric can be used to provide seed points that indicate a specific feature for segmentation, such as a molar or other tooth feature that may be difficult to process for conventional segmentation routines. Seed marks can then be used as input to a fast marching algorithm or other algorithm type, as described previously. In some cases, for example, adjacent teeth may not be accurately segmented with respect to each other; operator markup can provide useful guidance for segmentation processing where standard segmentation logic does not perform well. As FIG. 9A shows, the operator can have controls 90 available that allow the entered markup to be cleared or provided to the segmentation processor. As FIG. 9B shows, color or shading can be used to differentiate various teeth or other structures identified by segmentation. Additional controls 90 can also be used to display individual segmented elements, such as individual teeth, for example. As FIG. 9C highlights, in some exemplary embodiments, individual controls 90 can be used individually or in combination.

In one embodiment, segmentation of individual teeth from each other can use curvature thresholds to compute margin and border vertices, then use various growth techniques to define the bounds of each tooth relative to margin detection.

In some exemplary embodiments, controls 90 can include, but are not limited to enter/adjust seed or boundary geometrics, enter/adjust selected segmentation procedures, enter/adjust number of objects to segment, subdivide selected object, modify segmented object display, etc.

Figure 10:
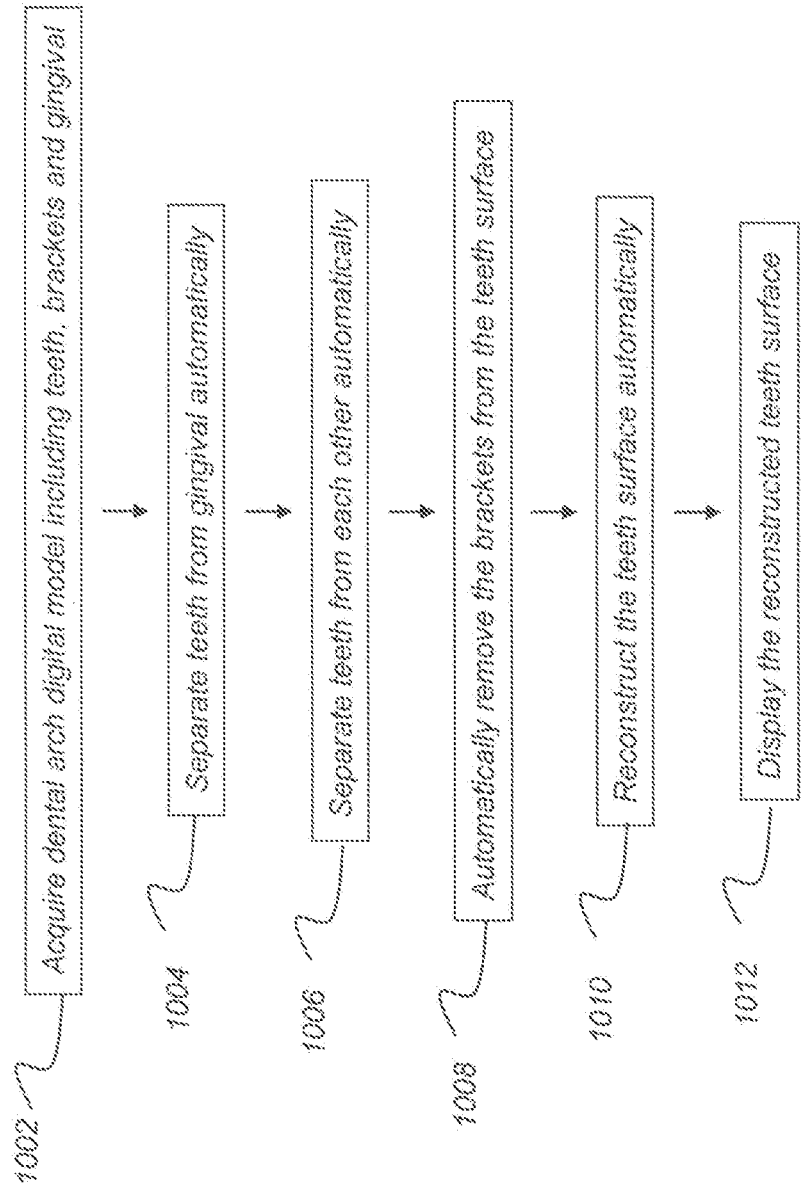
FIG. 10 is a logic flow diagram that shows a sequence for bracket removal from the tooth mesh surface according to an exemplary embodiment of the application.
Figure 11:
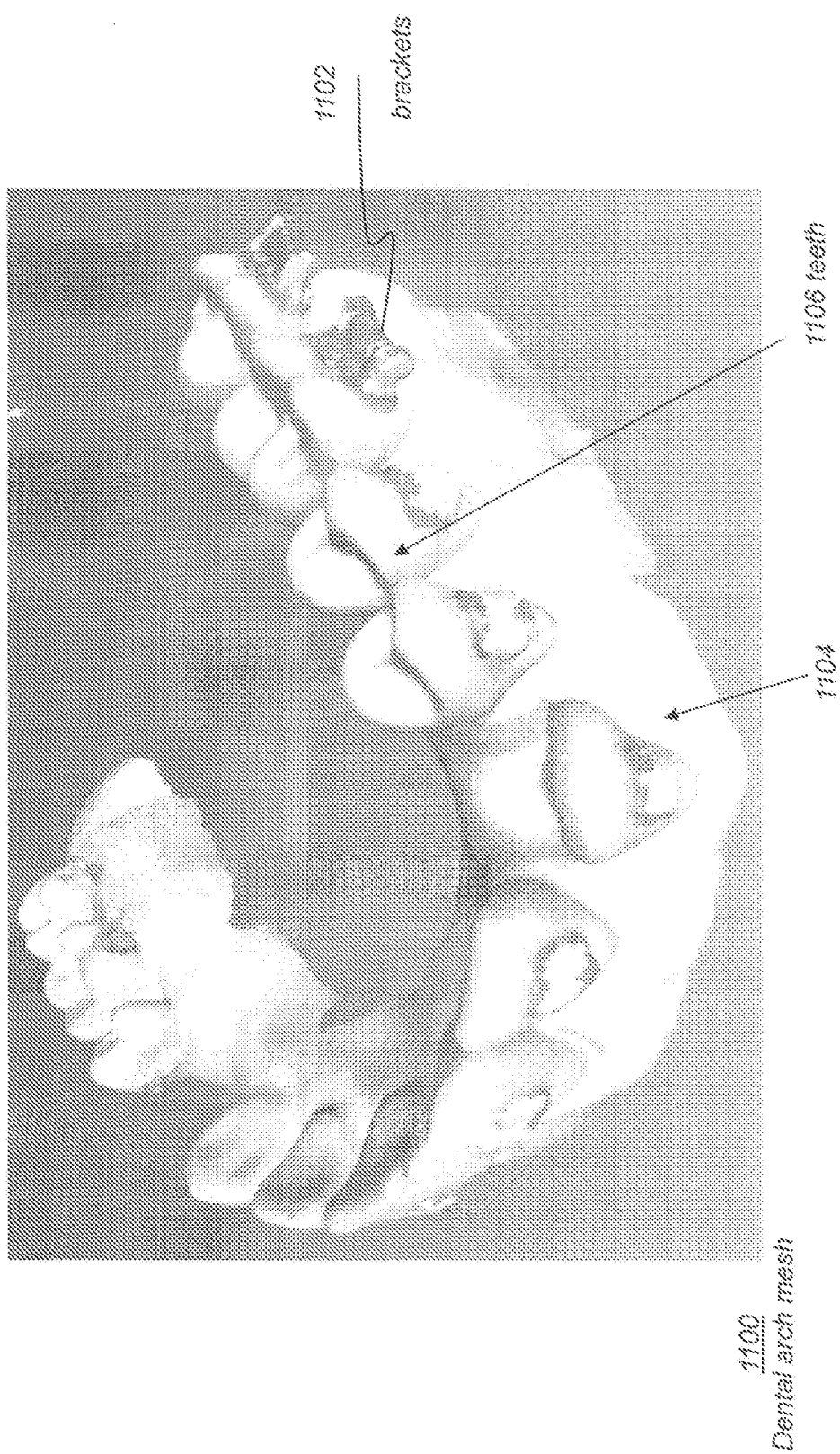
FIG. 11 shows an example of a dentition mesh containing teeth, brackets and gingival.

The logic flow diagram of FIG. 10 shows an exemplary embodiment of a workflow for bracket removal from a dentition 3D mesh according to the application. As shown in FIG. 10, a virtual or digital 3D dentition mesh model is obtained in step 1002. For example, a digital 3D dentition mesh model can be obtained by using an intraoral scanner. FIG. 11 is a diagram that shows an exemplary 3D dentition mesh that can be acquired in step 1002. As shown in FIG. 11, 3D dentition mesh 1100 can include brackets 1102, gingival 1104 and teeth 1106. Preferably, a result from the exemplary workflow process of FIG. 10 will be a 3D dentition mesh including the teeth 1106 and gingival 1104 from the 3D dentition mesh 1100, but without the brackets 1102 and tooth surfaces previously covered by brackets 1102 accurately re-constructed.

As shown in FIG. 10, steps 1004 and 1006 constitute a tooth segmentation method/system for an obtained dentition 3D mesh. As described herein, in one embodiment steps 1004 and 1006 can be implemented by similar steps of a hybrid sequence for tooth mesh segmentation depicted in FIG. 6A. Alternatively in another embodiment, steps 1004 and 1006 can be implemented by similar steps of a hybrid tooth segmentation method/system depicted in FIG. 6B.

Figure 12:
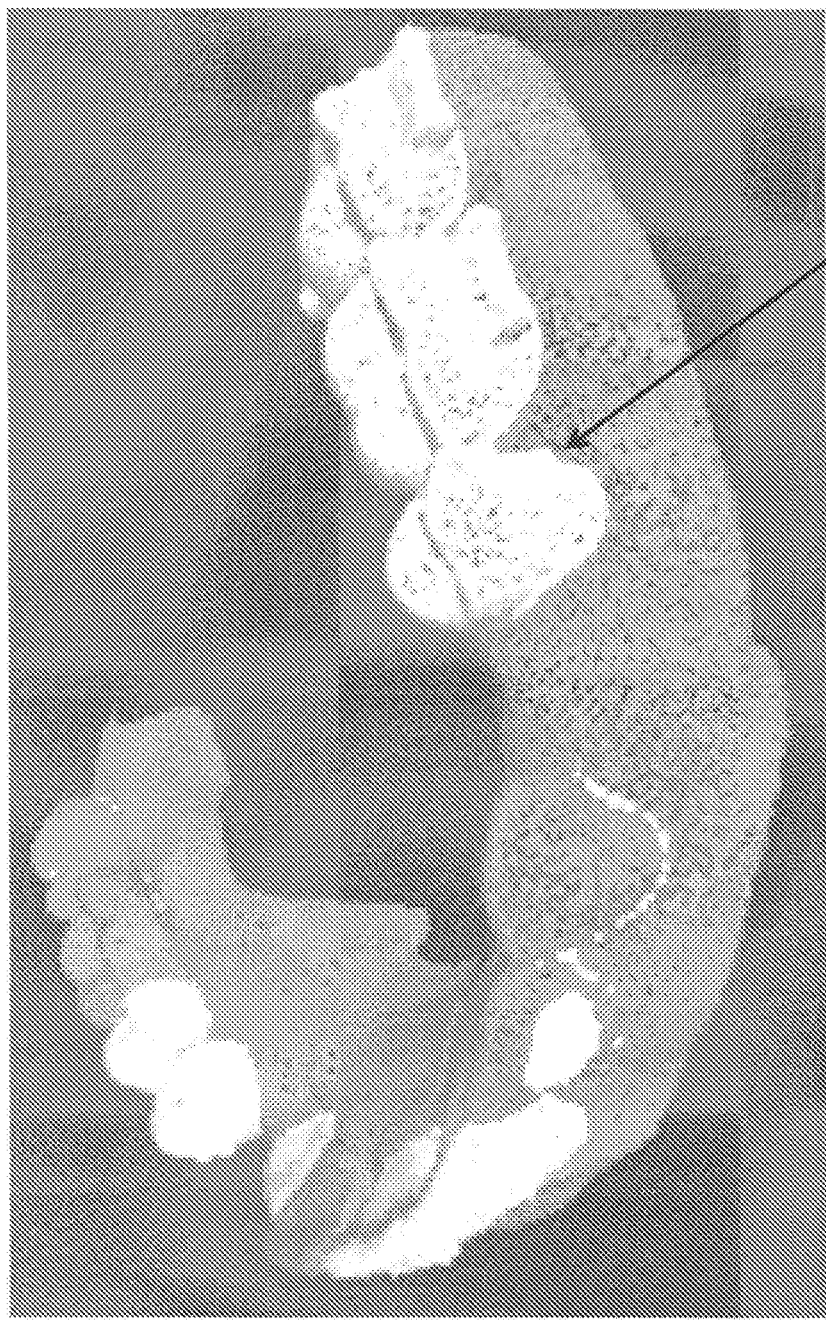
FIG. 12 is a diagram that shows exemplary resultant separated teeth from a 3D dentition mesh according to an exemplary embodiment of the application.

Continuing with the workflow in FIG. 10, brackets 1102 are automatically removed from the 3D dentition mesh 1100 (e.g., tooth surfaces) in step 1008. In one exemplary embodiment, the separated (or segmented) teeth resulting from step 1006 can individually undergo bracket removal and surface reconstruction described hereafter. FIG. 12 is a diagram that shows exemplary resultant separated teeth 1202 contained within the 3D dentition mesh 1100.

Figure 13C:
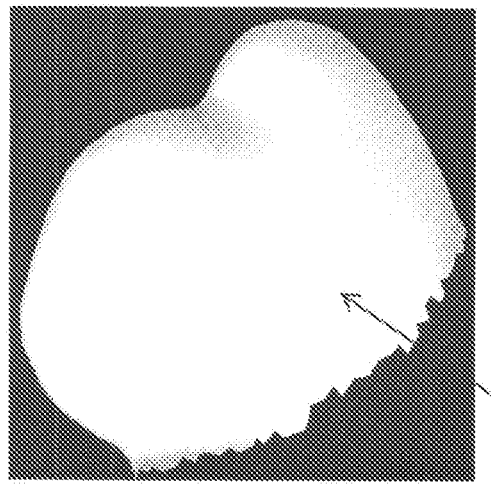
FIGS. 13A-13C shows an example of removing a bracket from a tooth surface of a 3D dentition mesh and reconstructing the tooth surface afterwards.
Figure 13B:
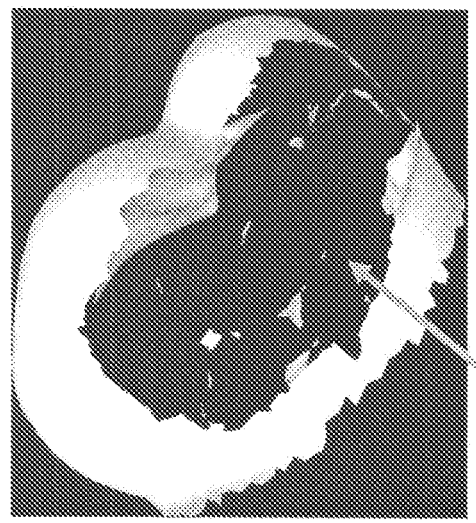
Figure 13A:
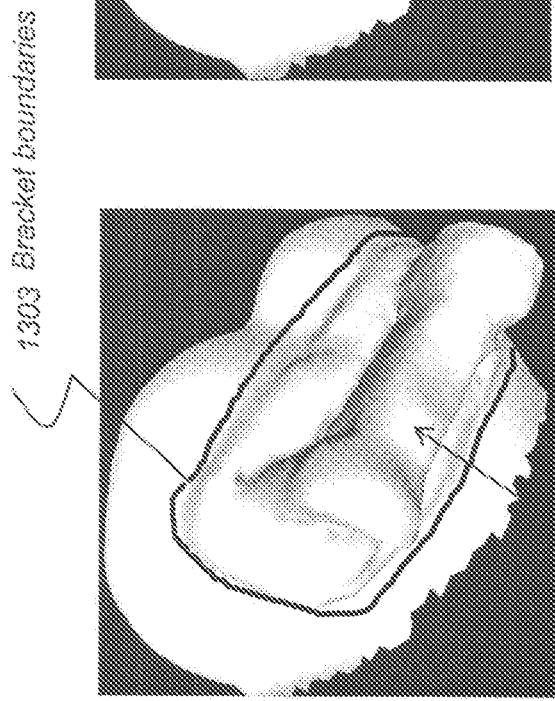

In step 1008, to automatically remove the brackets from surfaces of the separated teeth 1202, each individually segmented tooth (or crown) is examined and processed. An exemplary segmented tooth 1202 with bracket 1302 to be removed is shown in FIG. 13A. In one exemplary embodiment, an automatic bracket removal algorithm first detects boundaries of the bracket 1302. Various approaches known to one skilled in the imaging arts can be used to detect bracket boundaries in the 3D dentition mesh 1100. In one exemplary embodiment, bracket boundary detection can use an automated curvature-based algorithm that computes the curvatures of vertices in the mesh of tooth surfaces, and then uses a thresholding algorithm to identify margin vertices that have large negative curvatures. As shown in FIG. 13A, these identified margin vertices form a closed 3D curve or bracket boundary 1303 (or the boundary vertices of the bracket) that surrounds the bracket 1302. Then, mesh vertices within the closed 3D boundary are removed in the 3D dentition mesh 1100, which results in a hole 1304 on the tooth surface. FIG. 13B is a diagram that shows an exemplary segmented tooth 1202 with bracket 1302 removed. As shown in FIG. 13B, small white patches can be present in the bracket hole 1304; these white patches do not belong to the bracket 1302 itself, but can be other artifacts behind the original bracket. These artifacts can become visible after the bracket 1302 has been removed from the 3D dentition mesh 100 by an automatic bracket removal algorithm.

In step 1010, tooth surfaces of the segmented tooth 1202 having the bracket removed are automatically reconstructed. Various approaches known to one skilled in the imaging arts can be used to fill holes in the 3D dentition mesh 1100. An exemplary segmented tooth 1202 having automatically reconstructed tooth surface 1306 is shown in FIG. 13C. In exemplary embodiments, hole-filling procedures (e.g., tooth or crown surface reconstruction) can include a first step to generate an initial patch to fill the hole and a second step to smooth the reconstructed mesh to obtain better quality polygons (e.g., triangles) therein.

Figure 13E:
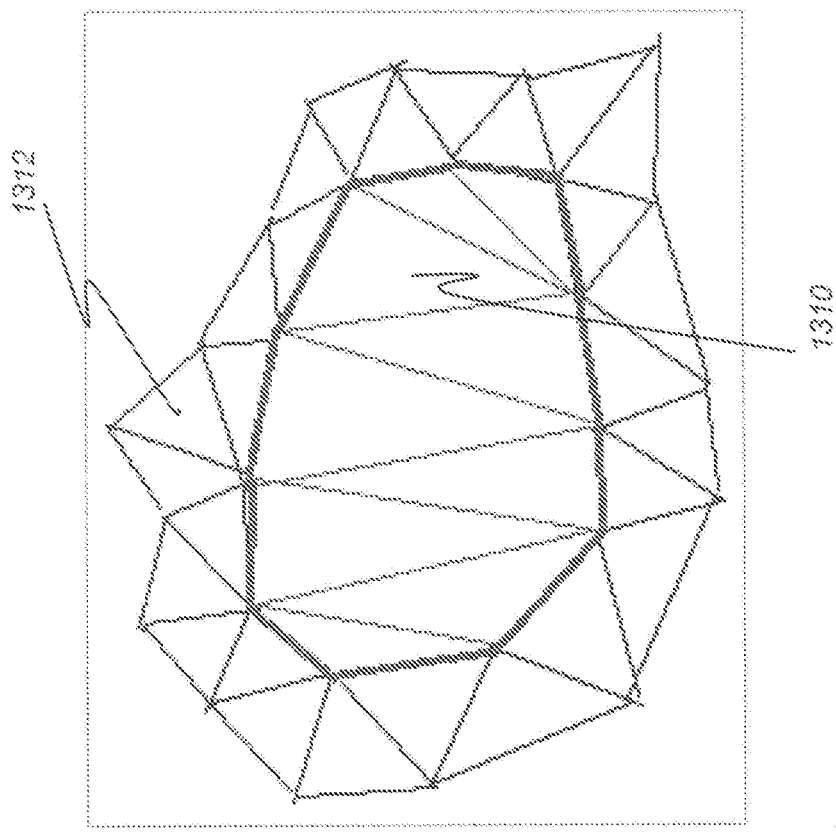
FIGS. 13D-13E are diagrams that show a hole on tooth mesh surface where a bracket is removed and an initial patch to fill the hole.
Figure 13D:
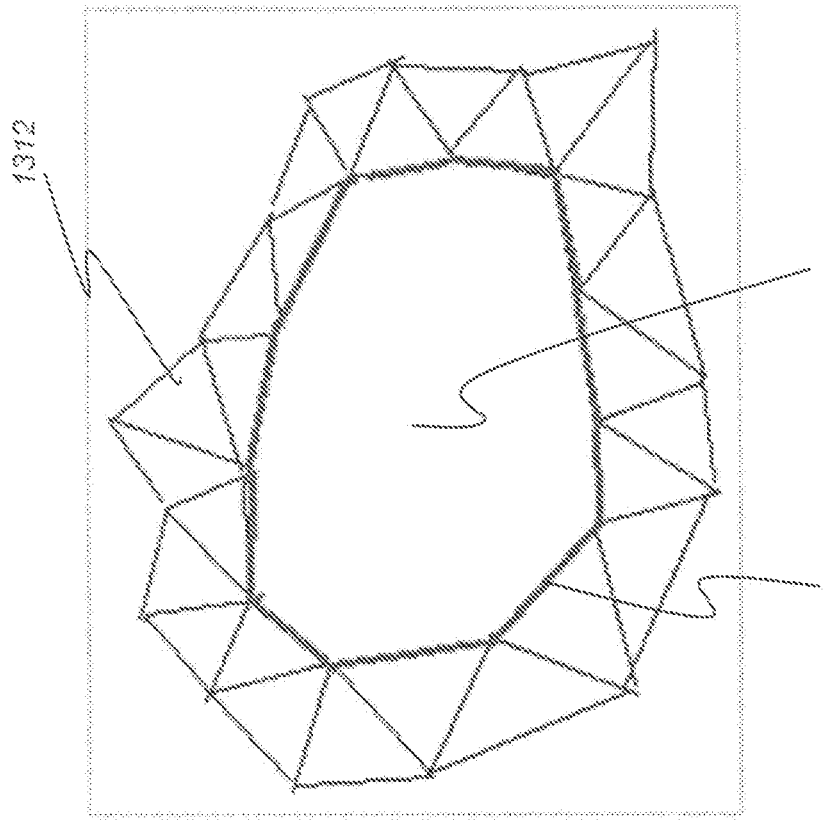

FIG. 13D shows a part of the 3D dentition mesh 1100 forming a 3D crown mesh surface after mesh portions representing a bracket are removed. A closed polygon 1303' represents a boundary of the (removed) bracket. A region 1308 enclosed by the closed polygon 1303' is the hole left by bracket removal. First in step 1010, an initial patch is generated to fill the tooth surface or hole 1308 (e.g., within the closed polygon 1303'). In one embodiment, the initial patch contains a plurality of triangles 1310 arranged in an exemplary prescribed pattern such as one formed by connecting vertices in the closed polygon 1303' to form the pattern shown in FIG. 13E. Then, in step 1010, triangles/polygons 1310 of the initial patch can be further modified or optimized. One exemplary procedure of modifying or optimally arranging the triangles 1310 is illustrated in FIG. 13F where four points A, B, C, and D form two triangles ABD and CDB in the triangles 1310, which are rearranged to become triangles ABC and CDA in an improved set of triangles 1310'. An improved triangle arrangement can reduce or avoid long, thin triangles.

In a second part of step 1010, the 3D mesh with the initial patch can be smoothed to obtain better quality. In one embodiment, the second part of step 1010 can correct positions of points created in the initial patch using local information globally. Thus, the 3D mesh including the initial patch (e.g., triangles 1310, 1310' within the hole 1303') and the surrounding regions, such as triangles 1312 surrounding (or nearby) the hole 1308' in FIG. 13D) can be smoothed using a Laplacian smoothing method that adjusts the location of each mesh vertex to the geometric center of its neighbor vertices.

For example, an implementation of mesh smoothing is described by Wei Zhao et al. in "A robust hole-filling algorithm for triangular mesh" that can implement a patch refinement algorithm using the Poisson equation with Dirichlet boundary conditions. The Poisson equation is formulated as $\Delta f = \text{div}(h) f|_{\partial \Omega} = f^*|_{\partial \Omega}$ where f is an unknown scalar function, $$\Delta f = \frac{\partial^2}{\partial x^2} + \frac{\partial^2}{\partial y^2} + \frac{\partial^2}{\partial z^2}$$

is Laplacian operator, h is the guidance vector field, div(h) is the divergence of h and f* is a known scalar function providing the boundary condition. The guidance vector field on a discrete triangle mesh in Wei Zhao's article is defined as a piecewise constant vector function whose domain is the set of all points on the mesh surface. The constant vector is defined for each triangle and this vector is coplanar with the triangle.

Figure 20:
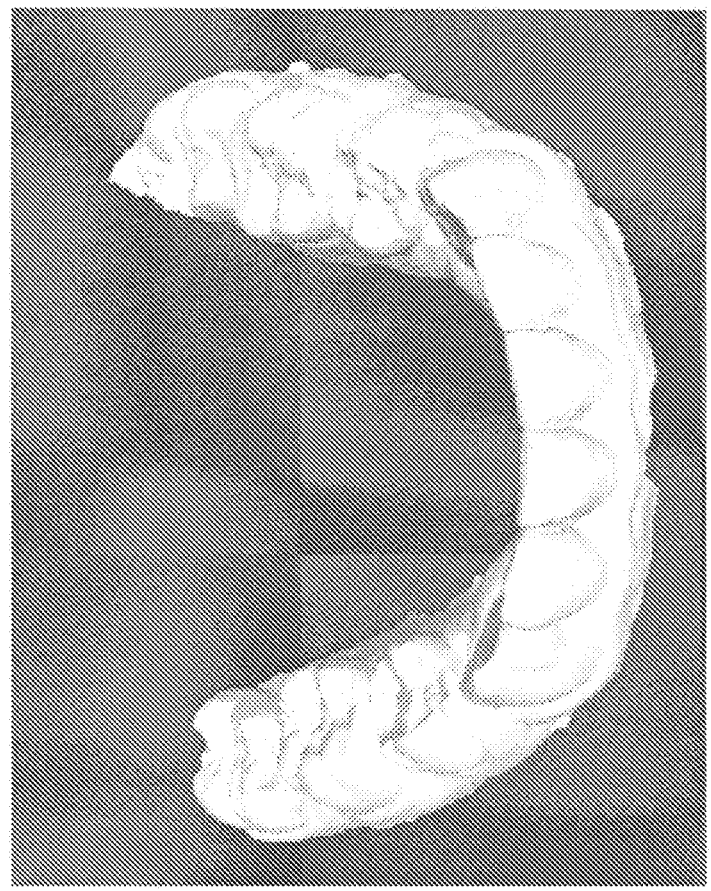
FIGS. 18-20 are diagrams that show respectively, an example of dentition model with brackets, the same dentition model with brackets identified, and reconstructed teeth after brackets are removed according to one exemplary embodiment of the application.

In step 1012, the exemplary segmented tooth 1202 having automatically reconstructed tooth surface 1306 (see FIG. 13C) can be displayed. Although described for one exemplary segmented tooth 1202, steps 1008, 1010 and 1012 can be repeatedly performed until all brackets are removed from 3D dentition mesh 1100. In this manner, the resultant corrected 3D dentition mesh 1100 can be displayed in step 1012 after each additional segmented tooth surface is corrected. Alternatively, steps 1008 and 1010 can be performed for all teeth in the 3D dentition mesh 1100, before the resultant corrected 3D dentition mesh 1100 is displayed in step 1012. FIG. 20 shown an exemplary entire resultant corrected 3D dentition mesh.

Certain exemplary method and/or apparatus embodiments can use alternative procedures to reconstruct the teeth surfaces. For example, in one exemplary embodiment, a 3D detention mesh from an intra-oral scan of the dentition before the braces were attached can be used in tooth surface reconstruction. In other exemplary embodiments, models of specific teeth taken from sets of full mouth tooth models for varying ages, dental arch sizes, ethnicity, sex, of the patient can be used in tooth surface reconstruction. In another exemplary embodiment, corresponding "mirror" teeth form the patient can be used.

Figure 14:
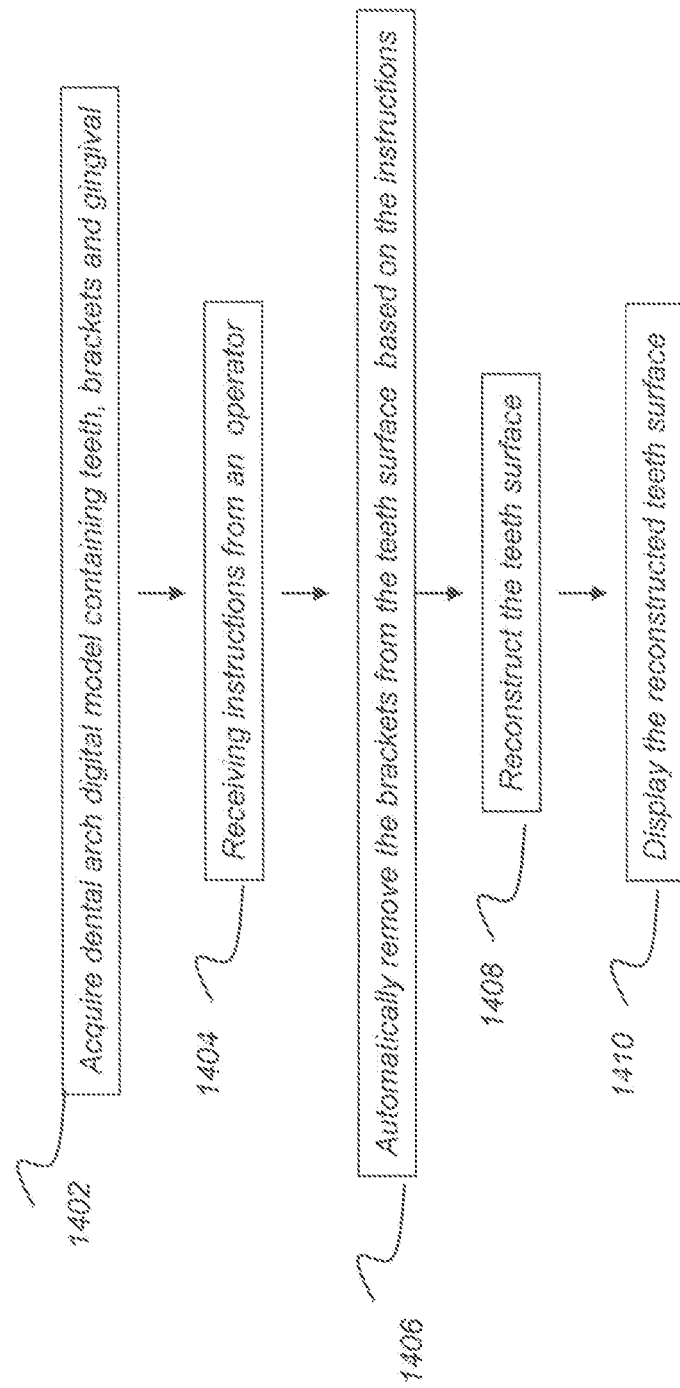
FIG. 14 is a logic flow diagram that shows a sequence for bracket removal from the tooth mesh surface according to another exemplary embodiment of the application.

FIG. 14 is a diagram that shows a workflow of another exemplary embodiment of the present invention of bracket removal on a 3D dentition mesh. A primary difference between the workflow shown in FIG. 10 and the workflow shown in FIG. 14 is that teeth segmentation is not required in workflow presented in FIG. 14. Again, a 3D dentition mesh is received in step 1402 that contains teeth, brackets, and gingival. Then, in step 1404, instructions are received from an operator regarding brackets in the 3D dentition mesh.

Figure 15:
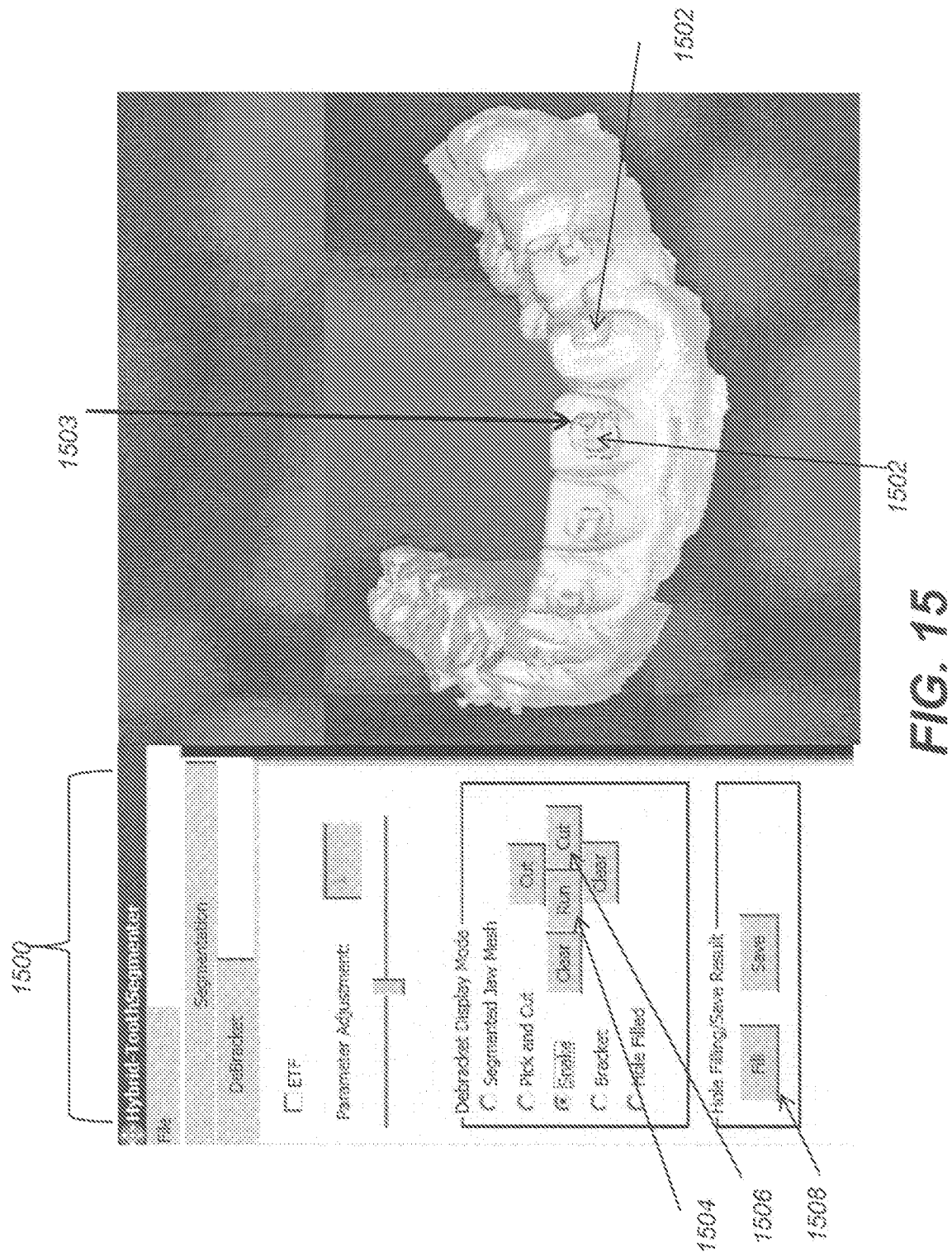
FIG. 15 shows an operator interface screen embodiment for review and entry of delineation instructions for separating brackets from tooth mesh according to one exemplary embodiment of the application.

FIG. 15 is a diagram that displays an exemplary GUI interface that allows the user to input information to identify brackets in the 3D dentition mesh. As shown in FIG. 15, one exemplary GUI interface 1500 enables nodes to be placed by the user for a 'snake' operation, which automatically encircles bracket 1502 boundaries, based on the entered nodes. An exemplary bracket boundary 1503 generated by the 'snake' operation is shown in FIG. 15. The 'snake' is an active shape model that is frequently used in automatic object segmentation in image processing, for example by delineating an object outline from a possibly noisy 2D image. The snakes active shape model is used in applications like object tracking, shape recognition, segmentation, edge detection and stereo matching. The snake active shape model or active contour model is known to one skilled in the imaging arts.

Figure 16:
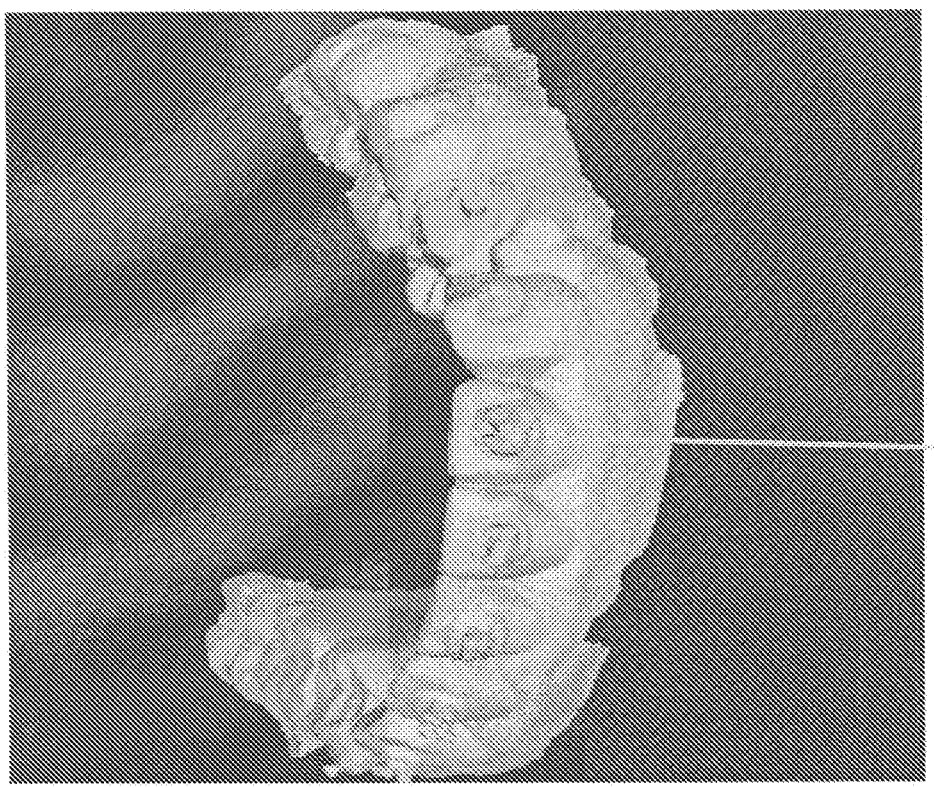
FIG. 16 shows an example of highlighted mesh vertices within a closed contour.

FIG. 16 shows vertices 1602 encircled by the boundary 1503 being highlighted in the 3D dentition mesh after the user pressed the 'run' button 1504 in FIG. 15. Identified vertices 1602 are to be removed from the original 3D dentition mesh. In one exemplary embodiment, the GUI system 1500 can let the user inspect the intermediate results 1602, and if satisfied, the user presses the 'cut' button 1506, then the vertices 1602 change their highlight (e.g., color, texture, etc.) to indicate that these vertices are to be removed from the original 3D dentition mesh. In one exemplary embodiment, to automatically remove the brackets from the teeth surface based on the operator instructions in step 1406 can be performed by the operator pressing the 'cut' button 1506.

Figure 17:
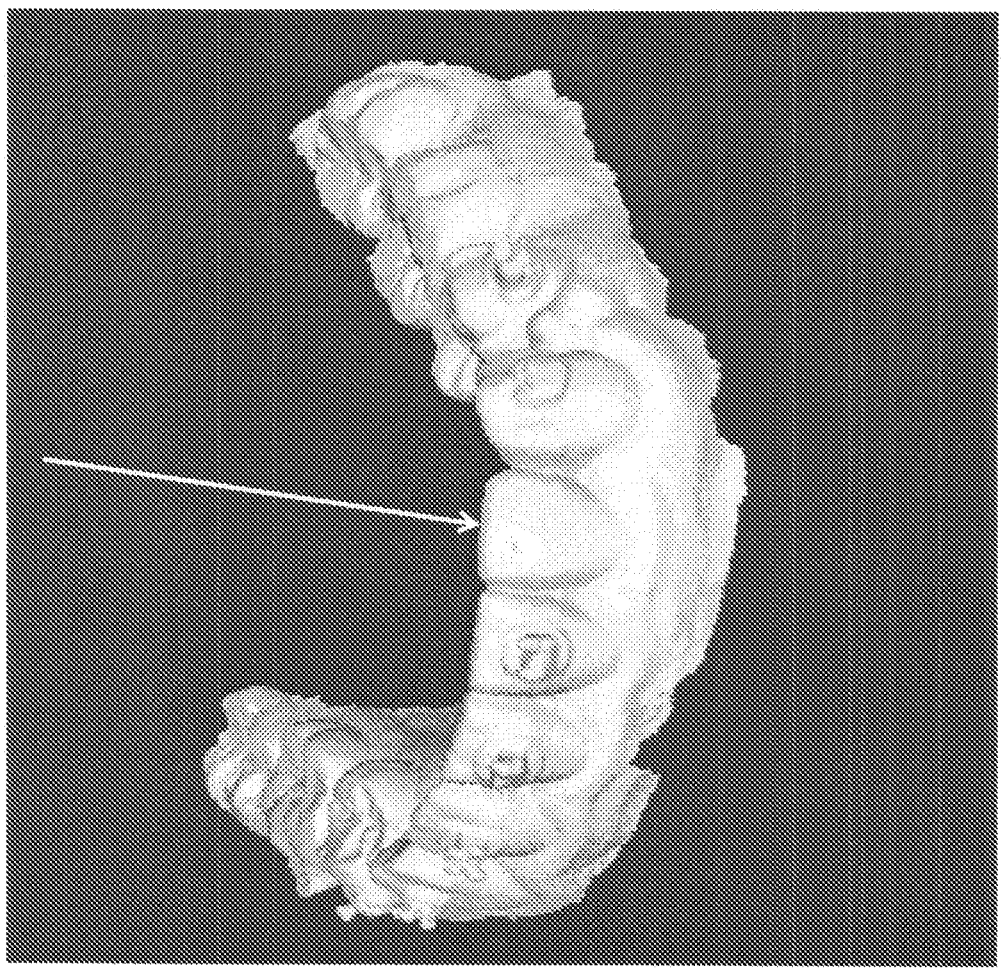
FIG. 17 shows an example of a reconstructed tooth surface after the bracket is removed.

Then, the tooth surfaces are filled or reconstructed in step 1408. In one exemplary embodiment, step 1408 is performed when the user presses the 'fill' button 1508 in FIG. 15 to reconstruct tooth surfaces. Step 1408 can be performed using known algorithms such as described herein with respect to FIG. 10. Then, the results can be displayed for inspection in step 1410. FIG. 17 shows an example of a reconstructed tooth surface 1702 after the bracket is removed. Alternatively, the results of step 1408 could be stored or transmitted over a network to a remote computer for use.

Figure 18:
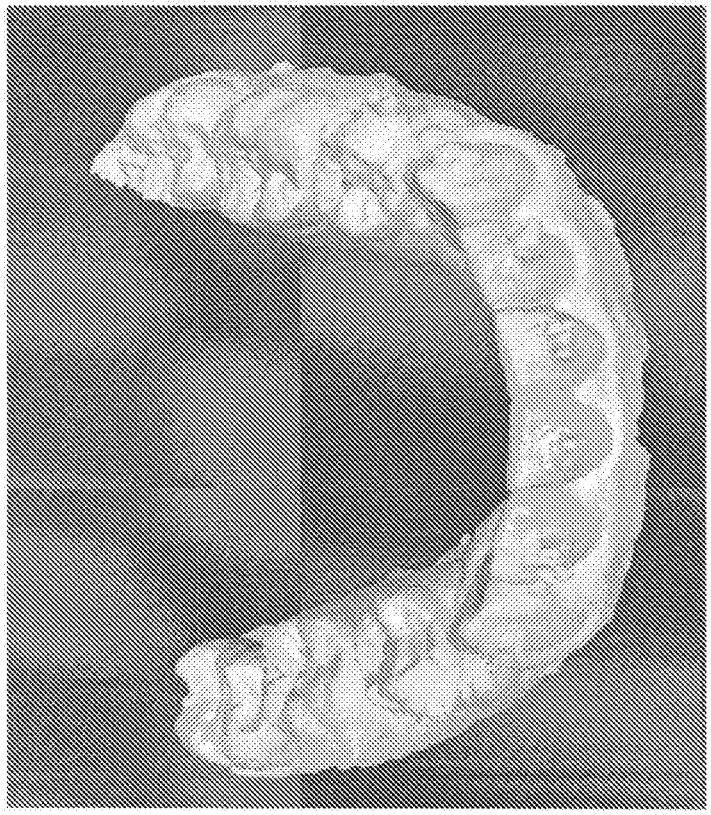
Figure 19:
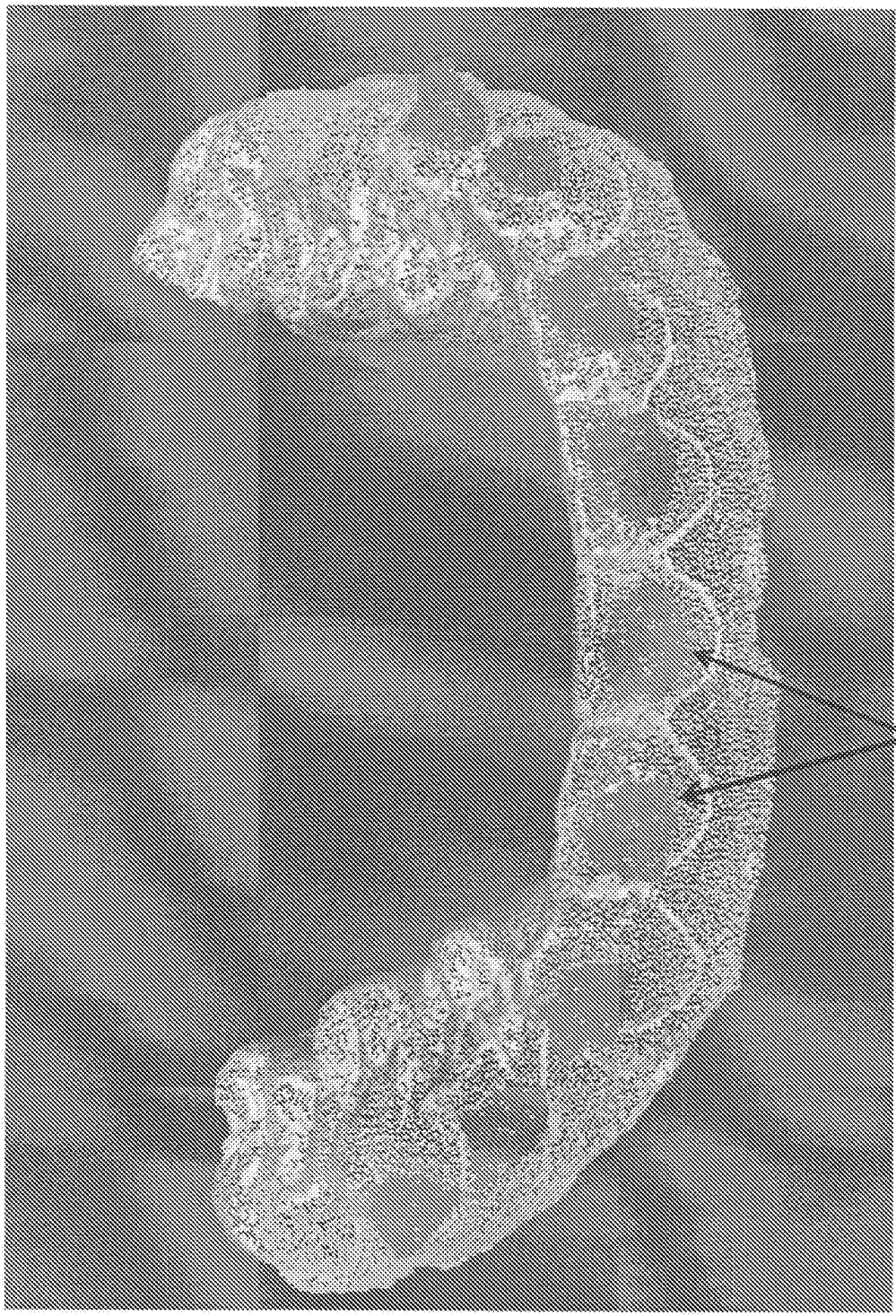

Again, in FIG. 14, the operations can be performed tooth by tooth, on a plurality of teeth or all teeth simultaneously at a time with respect to the 3D dentition mesh. FIGS. 18-20 are diagrams that show a complete removal of all brackets concurrently from a 3D jaw mesh. FIG. 18 is a diagram that shows a 3D dentition mesh 1800 with teeth, brackets and gingival. FIG. 19 is a diagram that shows the intermediate results of 'snake' cut operation with vertices 1802 that are to be removed being highlighted. FIG. 20 is a diagram that shows each of the final reconstructed teeth surfaces 1806 after all brackets are removed and all fill operations are completed.

It is noted that the above described user actions such as pressing the 'cut' button, pressing the 'fill' button and pressing the 'run' button are illustrative. In reality, these actions are not necessary and can be accomplished automatically by computer software.

Figure 21A:
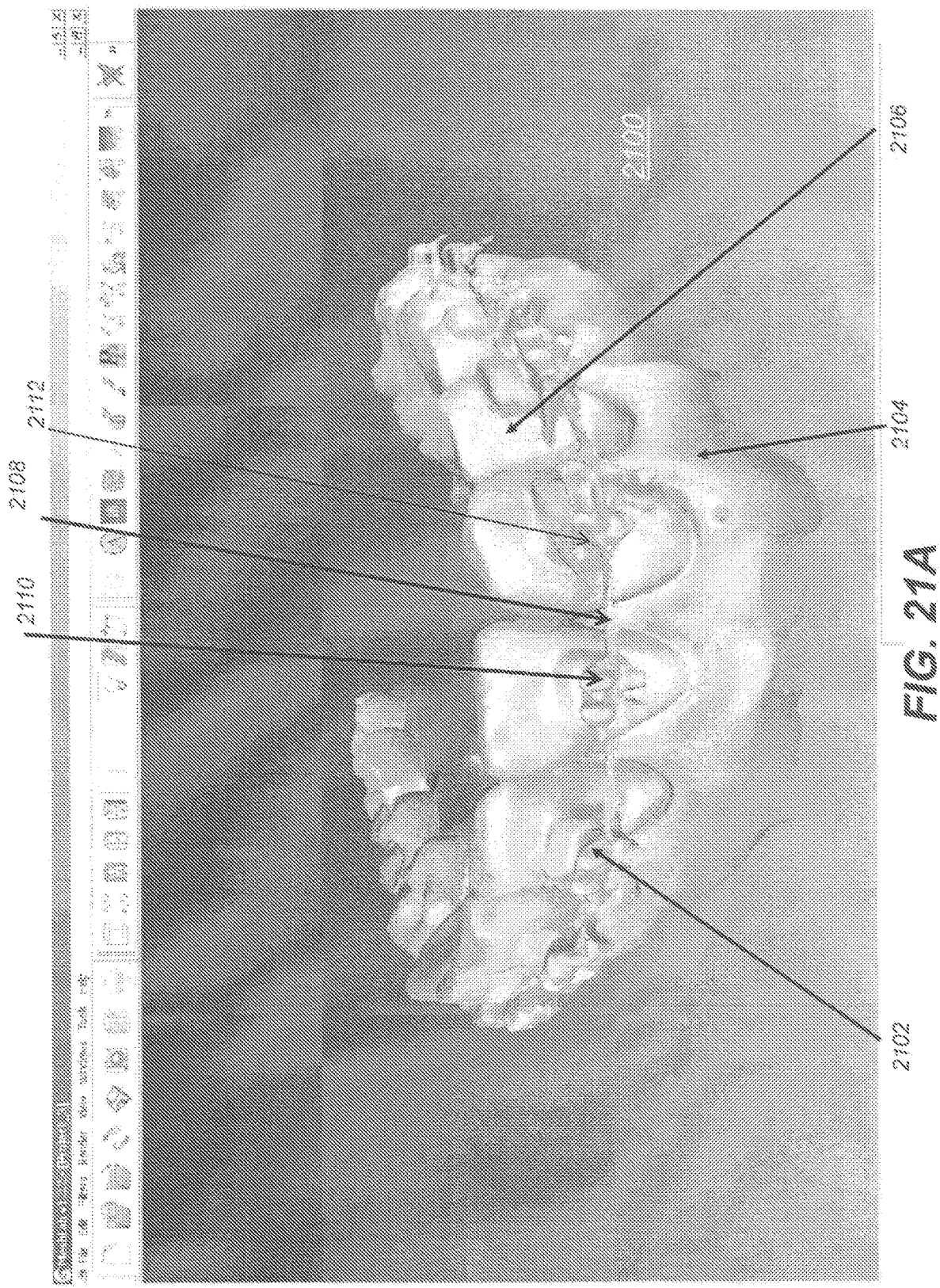
FIG. 21A is a diagram that shows an example of a dentition mesh containing teeth, bridged brackets and gingival.
Figure 21B:
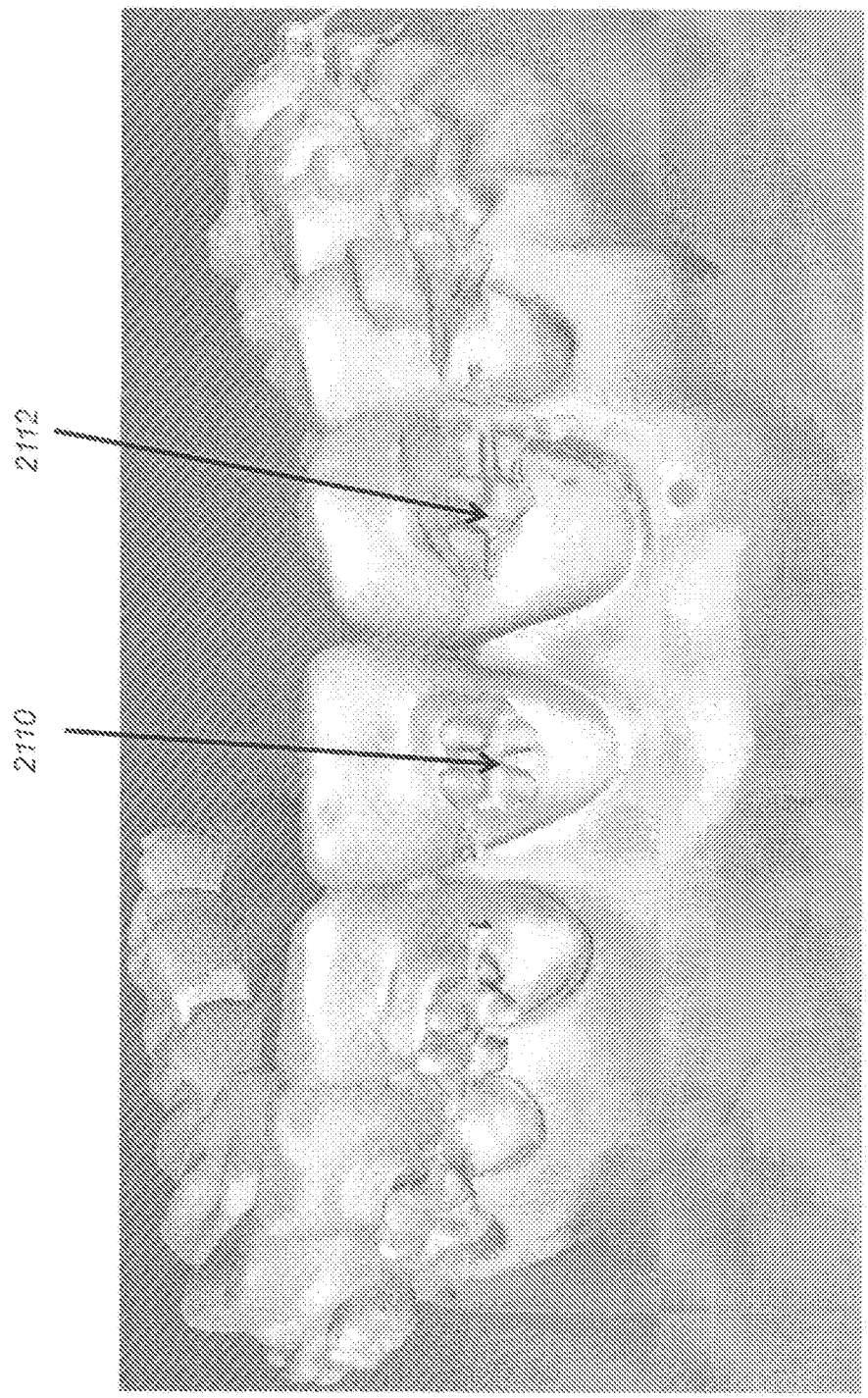
FIG. 21B is a diagram that shows an example dentition mesh with bridges (e.g., wires) between brackets broken according to exemplary embodiments of the application.

In some cases, 3D dentition models produced by an intraoral scanner may contain wires that bridge neighboring two brackets. In this situation, earlier described embodiments are insufficient for removal of the brackets and wires. FIG. 21A is a diagram that shows another exemplary dentition model. As shown in FIG. 21A, dentition model 2100 includes brackets 2102, gingival 2104, teeth 2106 and bridged brackets where a wire 2108 connects at least bracket 2110 and bracket 2112. Generally, wires 2108 swill connect all brackets 2102. As shown in FIG. 21B, the wire 2108 can erased either automatically or interactively according to certain exemplary method and/or apparatus embodiments of the application.

Figure 23:
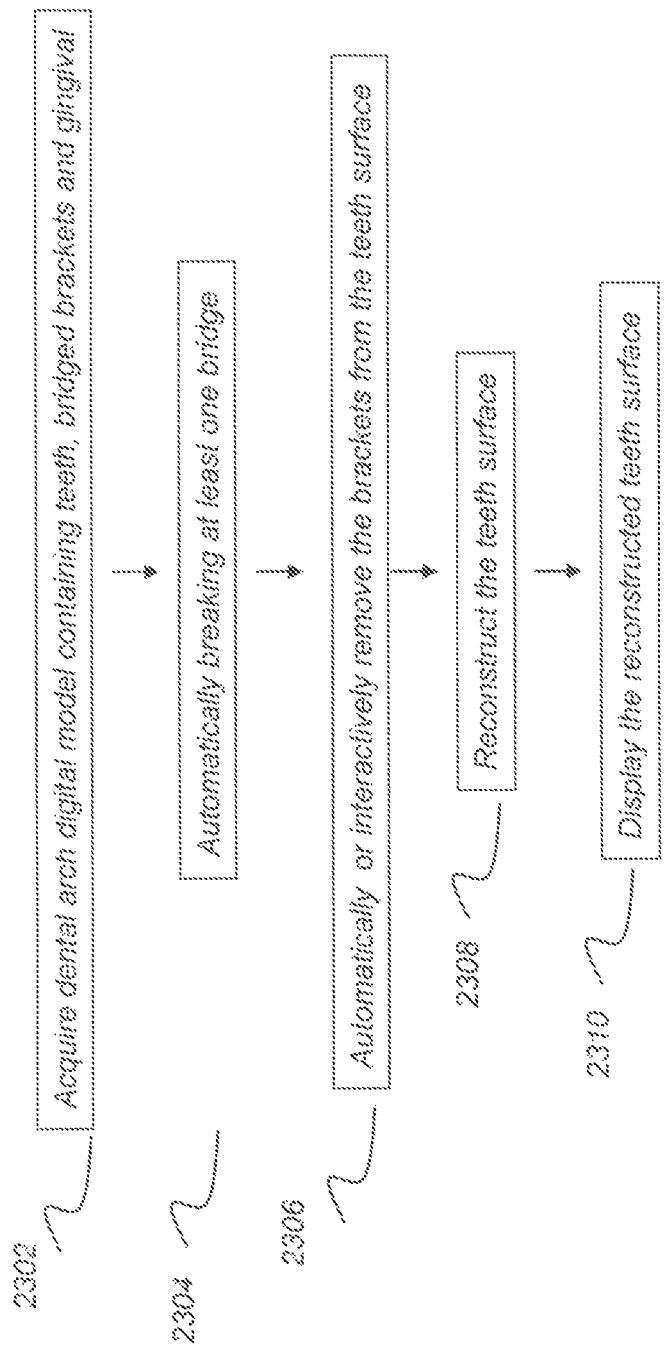
FIG. 23 is a logic flow diagram that shows a sequence for bridged bracket removal from the tooth mesh surface according to an embodiment of the present disclosure.

FIG. 23 is a logic flow diagram that shows an exemplary sequence for bridged bracket removal from tooth mesh surfaces according to an embodiment of the application. As shown in FIG. 23, a dentition model with bridged brackets is obtained in step 2302, which is immediately followed by step 2304 that includes "automatically breaking the bridge". One exemplary detection embodiment that can be used to automatically break the bridge (or wire) is described as follows.

Figure 21C:
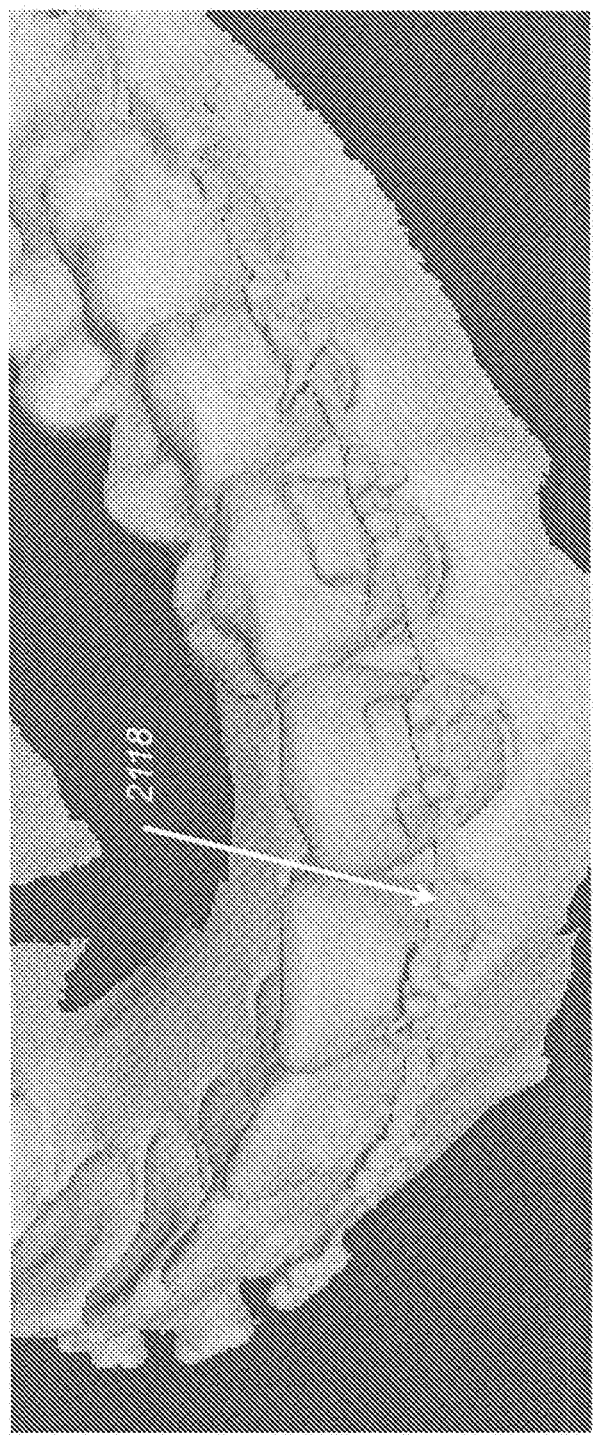
FIG. 21C is a diagram that shows an example dentition mesh illustrating detection of bridges (e.g., wires).

Given a vertex V in the dentition mesh modal, perform a nearest neighbor search with an exemplary 5 mm radius resulting in a set of neighbor vertices VN. Check the normal of each of the vertices in VN. If it is found that there is at least one vertex in VN whose normal points to the opposite direction of the normal of V (e.g. if these two normal vectors' dot product <−0.9), then V is a candidate vertex on the wire (or bridge). This procedure is applied to the entire mesh resulting in a plurality of candidate vertices. Said candidate vertices are used to compute a plurality of connected regions. Each of said connected regions is analyzed using the algorithm of principal component analysis commonly used by people skilled in the art for shape (e.g. wire) detection. An exemplary bridge (wire) detection result 2118 resulting from step 2306 is shown in FIG. 21C. These vertices of the 3D detention mesh detected in step 2306 (e.g., associated with the wires 2108) are excluded or removed from the 3D detention mesh in the subsequent steps 2306-2308.

Step 2306 employs either exemplary automatic or interactive methods to remove the disconnected brackets. The bracket removed tooth surface is reconstructed automatically in step 2308 and the results are displayed for inspection in Step 2310. For example, steps 2306 and 2308 can be performed as described above for FIGS. 10 and 14, respectively.

Figure 22:
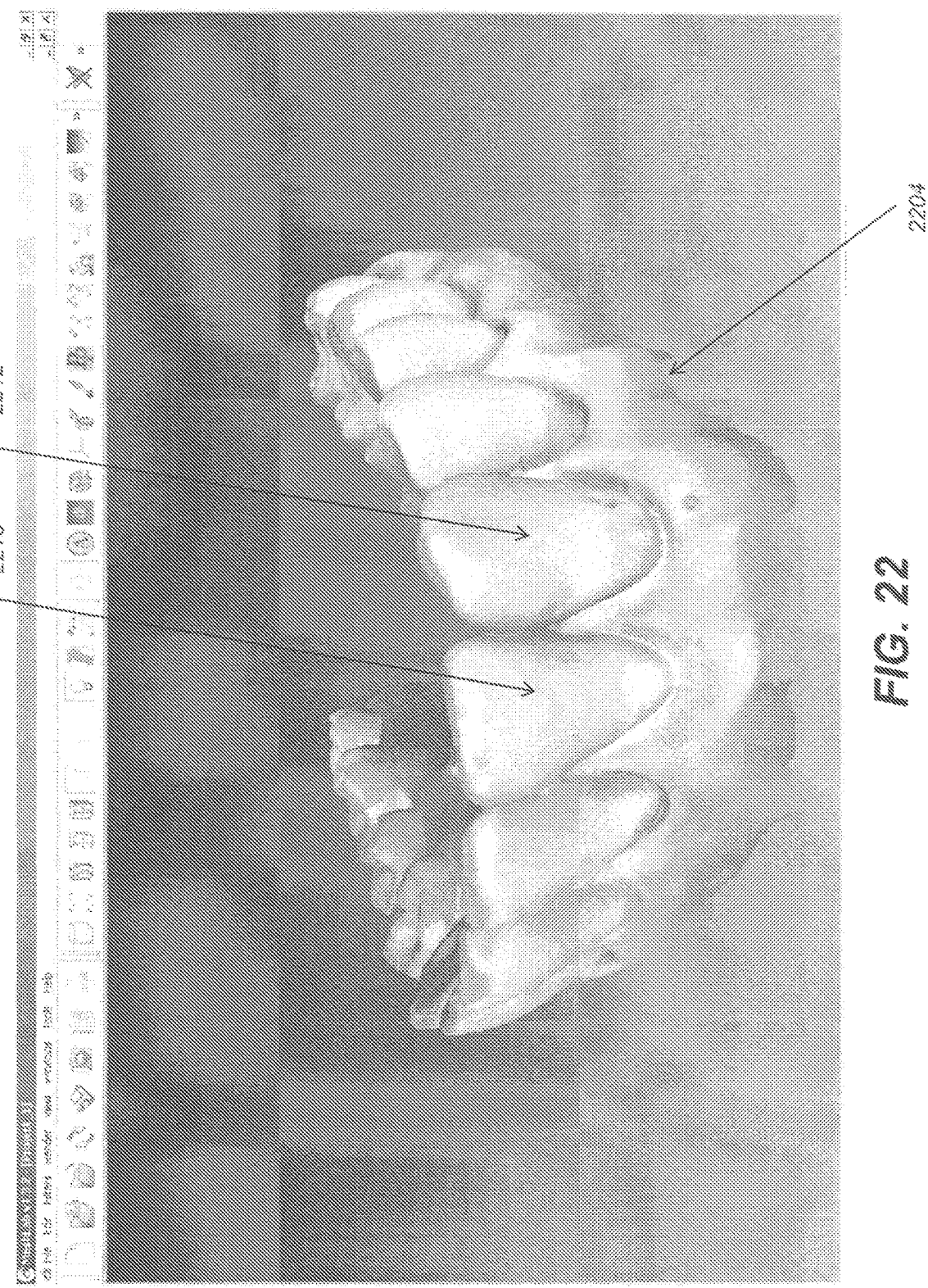
FIG. 22 shows example results of bracket removal and surface reconstruction after breaking the bridge wires according to exemplary embodiments of the application.

In FIG. 22, an actual result 2204 for bridged brackets removal is shown. The surface reconstructed tooth 2210 and tooth 2212 in FIG. 22 correspond to bracket 2110 and bracket 2112 in FIG. 21A before the brackets and wire 2108 are removed.

Figure 24:
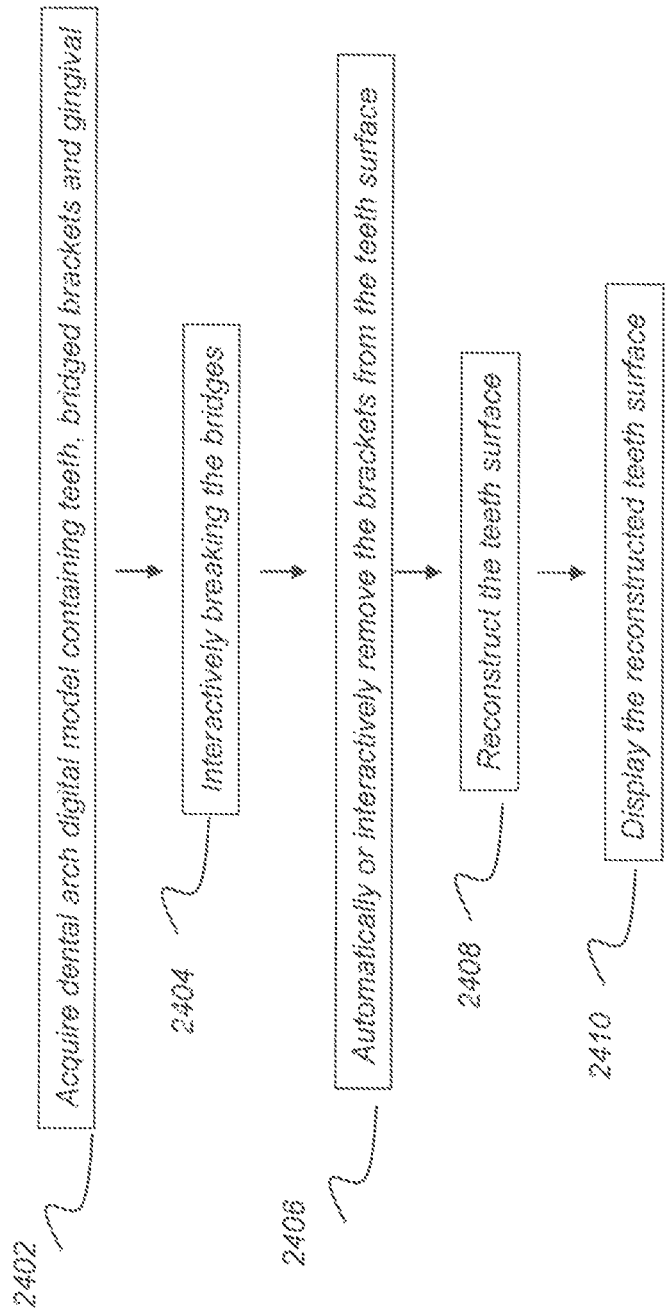
FIG. 24 is a logic flow diagram that shows a sequence for bridged bracket removal from the tooth mesh surface according to another embodiment of the present disclosure.

FIG. 24 is a logic flow chart that shows another exemplary method embodiment dealing with bridged brackets removal. As shown in FIG. 24, a dentition model with bridged brackets is acquired in step 2402, which is immediately followed by a step 2404 of "interactively breaking said bridge". In one exemplary embodiment, interactive operation effectively erases the thin wires with the assistance from a human by selecting and deleting mesh vertices that belong to the thin wires in step 2404. In one exemplary embodiment, step 2404 can use a GUI with selectable operator actions to "clear", "paint" (e.g., operator identify pixels showing wires), "auto paint", "approve" (e.g., paint or auto paint), and "clear" to interactively break the bridges or remove the wires from the 3D dentition mesh based on the operator instructions. Then, step 2406 employs either automatic or interactive method to remove the disconnected brackets as previously described. The bracket removed tooth surfaces can be reconstructed automatically in step 2408 as previously described. Then, the results are displayed for inspection in step 2410.

As described herein, exemplary method and/or apparatus embodiments to remove bridged brackets and restore teeth surfaces in a 3D dentition model are intended to be illustrative examples and the application is not so limited. For example, in one exemplary embodiment, bridged brackets can be removed and teeth surfaces restored by automatically identifying parts of a bracket and/or wire without human intervention in an obtained 3D dentition model by growing the identified parts into a region that covers the brackets and/or wires entirely (e.g., and preferably slightly beyond the brackets and/or wires boundaries). removing the region from the 3D dentition model surface, and restoring the removed region surfaces using hole filing techniques. In some exemplary embodiments, hole filling can fill portions of gingival.

Consistent with one embodiment, the present disclosure can use a computer program with stored instructions that control system functions for image acquisition and image data processing for image data that is stored and accessed from an electronic memory. As can be appreciated by those skilled in the image processing arts, a computer program of an embodiment of the present invention can be utilized by a suitable, general-purpose computer system, such as a personal computer or workstation that acts as an image processor, when provided with a suitable software program so that the processor operates to acquire, process, transmit, store, and display data as described herein. Many other types of computer systems architectures can be used to execute the computer program of the present invention, including an arrangement of networked processors, for example.

The computer program for performing the method of the present invention may be stored in a computer readable storage medium. This medium may comprise, for example; magnetic storage media such as a magnetic disk such as a hard drive or removable device or magnetic tape; optical storage media such as an optical disc, optical tape, or machine readable optical encoding; solid state electronic storage devices such as random access memory (RAM), or read only memory (ROM); or any other physical device or medium employed to store a computer program. The computer program for performing the method of the present invention may also be stored on computer readable storage medium that is connected to the image processor by way of the internet or other network or communication medium. Those skilled in the image data processing arts will further readily recognize that the equivalent of such a computer program product may also be constructed in hardware.

It is noted that the term "memory", equivalent to "computer-accessible memory" in the context of the present disclosure, can refer to any type of temporary or more enduring data storage workspace used for storing and operating upon image data and accessible to a computer system, including a database. The memory could be non-volatile, using, for example, a long-term storage medium such as magnetic or optical storage. Alternately, the memory could be of a more volatile nature, using an electronic circuit, such as random-access memory (RAM) that is used as a temporary buffer or workspace by a microprocessor or other control logic processor device. Display data, for example, is typically stored in a temporary storage buffer that is directly associated with a display device and is periodically refreshed as needed in order to provide displayed data. This temporary storage buffer can also be considered to be a memory, as the term is used in the present disclosure. Memory is also used as the data workspace for executing and storing intermediate and final results of calculations and other processing. Computer-accessible memory can be volatile, non-volatile, or a hybrid combination of volatile and non-volatile types.

It is understood that the computer program product of the present disclosure may make use of various image manipulation algorithms and processes that are well known. It will be further understood that the computer program product embodiment of the present invention may embody algorithms and processes not specifically shown or described herein that are useful for implementation. Such algorithms and processes may include conventional utilities that are within the ordinary skill of the image processing arts. Additional aspects of such algorithms and systems, and hardware and/or software for producing and otherwise processing the images or co-operating with the computer program product of the present invention, are not specifically shown or described herein and may be selected from such algorithms, systems, hardware, components and elements known in the art.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In this document, the terms "including" and "in which" are used as the plain-English equivalents of the respective terms "comprising" and "wherein." Also, in the following claims, the terms "including" and "comprising" are open-ended, that is, a system, device, article, or process that includes elements in addition to those listed after such a term in a claim are still deemed to fall within the scope of that claim.

Exemplary embodiments according to the application can include various features described herein (individually or in combination).

While the invention has been illustrated with respect to one or more implementations, alterations and/or modifications can be made to the illustrated examples without departing from the spirit and scope of the appended claims. The presently disclosed embodiments are therefore considered in all respects to be illustrative and not restrictive. In addition, while a particular feature of the invention can have been disclosed with respect to one of several implementations, such feature can be combined with one or more other features of the other implementations as can be desired and advantageous for any given or particular function. The term "at least one of" is used to mean one or more of the listed items can be selected. The term "about" indicates that the value listed can be somewhat altered, as long as the alteration does not result in nonconformance of the process or structure to the illustrated embodiment. Other embodiments of the invention will be apparent to those skilled in the art from consideration of the specification and practice of the invention disclosed herein. It is intended that the specification and examples be considered as exemplary only, with a true scope and spirit of the invention being indicated by the following claims, and all changes that come within the meaning and range of equivalents thereof are intended to be embraced therein.

The invention claimed is:

1. A method for generating a digital model of reconstructed dentition from a digital model of a patient's dentition, the method comprising:

obtaining a 3-D digital mesh model of the patient's dentition including non-segmented data corresponding collectively to braces, teeth, and gingival, wherein the 3-D digital mesh model was formed by intraoral scanning the teeth of the patient, the gingival of the patient, and an archwire and brackets of the braces;

modifying the 3-D digital mesh dentition model by detecting archwire portions of the braces therein, and removing the detected archwire portions therefrom;

adjusting the 3-D digital mesh dentition model by detecting bracket portions of the braces therein, and removing the detected bracket portions therefrom;

reconstructing teeth surfaces of the adjusted 3-D digital mesh dentition model previously covered by the archwire portions and the bracket portions of the braces; and displaying, storing, or transmitting over a network to another computer, the reconstructed 3-D digital mesh dentition model.

2. A computer-implemented method for generating a digital model of reconstructed dentition from a digital model of a patient's dentition, the method comprising:

obtaining a first 3-D digital mesh dentition model including non-segmented data corresponding collectively to braces, teeth, and gingival generated by intraoral scanning;

generating a second 3-D digital mesh dentition model by detecting archwire portions of the braces in the first 3-D digital mesh dentition model and removing the detected archwire portions;

generating a third 3-D digital mesh dentition model by detecting bracket portions of the braces in the second 3-D digital mesh dentition model and removing the detected bracket portions;

reconstructing teeth surfaces of the third 3-D digital mesh dentition model previously covered by the archwire and bracket portions of the braces; and displaying, transmitting, or storing the reconstructed 3-D digital mesh dentition model.

3. The method of claim 2, where the removing archwire portions of the braces therefrom separates the braces in the 3-D digital mesh dentition model into a plurality of bracket sections.

4. The method of claim 2, where the reconstructing teeth surfaces uses a hole filing algorithm comprising:

first filling each of a plurality of holes corresponding to removed brackets and an archwire in the third 3-D digital mesh dentition model using a polygon filling process to generate a patched surface; and smoothing the patched surfaces in the third 3-D digital mesh dentition model to generate the reconstructed 3-D digital mesh dentition model.

5. The method of claim 2, where the reconstructing teeth surfaces uses data from a previous 3-D digital mesh dentition model of the patient before the braces were attached.

6. The method of claim 2, where the reconstructed 3-D digital mesh dentition model does not include the braces.

7. The method of claim 2, further comprising performing automatic tooth component segmentation on the obtained first 3-D digital mesh model and displaying automated segmentation results, where the automated segmentation results distinguish one or more teeth from the patient's gum tissue, and where the automated segmentation results distinguish individual teeth from each other in said one or more teeth.

8. The method of claim 7, further comprising performing interactive segmentation of the automated segmentation results according to an operator instruction, where the automated segmentation results distinguish said individual teeth from each other.

9. The method of claim 2, where the generating a third 3-D digital mesh dentition model by removing bracket portions of the braces from the second 3-D digital mesh dentition model comprises performing interactive segmentation of the bracket portions according to an operator instruction on the second 3-D digital mesh dentition model; and removing, using a control logic processor, the segmented bracket portions from the second 3-D digital mesh dentition model.

10. The method of claim 9 wherein the operator instruction comprises a traced line segment.

11. The method of claim 2, where obtaining the first 3-D mesh model comprises acquiring a plurality of structured light images from a hand-held intraoral camera.

12. An apparatus configured to generate a digital model of dentition, comprising:

means for obtaining a first 3-D digital mesh model of the patient's dentition including non-segmented data representative collectively of braces, teeth, and gingival that was generated by intraoral scanning;

means for generating a second 3-D digital mesh dentition model by detecting archwire portions of the braces in the first 3-D digital mesh model and removing the detected archwire portions;

means for generating a third 3-D digital mesh dentition model by detecting bracket portions of the braces in the second 3-D digital mesh model and removing the detected bracket portions;

means for reconstructing teeth surfaces of the third 3-D digital mesh dentition model previously covered by the archwire portions and the bracket portions of the braces; and means for displaying, storing, or transmitting over a network to another computer, the reconstructed 3-D digital mesh dentition model.

13. The apparatus of claim 12, where the removing archwire portions of the braces from the first 3-D digital mesh model separates the braces in the 3-D digital mesh dentition model into a plurality of bracket sections.

\* \* \* \* \*